(12) United States Patent
Singh et al.

(10) Patent No.: US 8,990,944 B1
(45) Date of Patent: Mar. 24, 2015

(54) SYSTEMS AND METHODS FOR AUTOMATICALLY DETECTING BACKDOORS

(71) Applicant: FireEye, Inc., Milpitas, CA (US)

(72) Inventors: Abhishek Singh, Milpitas, CA (US); Jayaraman Manni, San Jose, CA (US)

(73) Assignee: FireEye, Inc., Milpitas, CA (US)

( * ) Notice: Subject to any disclaimer, the term of this patent is extended or adjusted under 35 U.S.C. 154(b) by 258 days.

(21) Appl. No.: 13/775,175

(22) Filed: Feb. 23, 2013

(51) Int. Cl.
G06F 21/56 (2013.01)
G06F 21/57 (2013.01)

(52) U.S. Cl.
CPC .............. *G06F 21/56* (2013.01); *G06F 21/566* (2013.01); *G06F 21/577* (2013.01)
USPC ......................................................... 726/24

(58) Field of Classification Search
CPC ..... G06F 21/56; G06F 21/566; G06F 21/577; G06F 2009/45595
USPC .......................................................... 726/24
See application file for complete search history.

(56) References Cited

U.S. PATENT DOCUMENTS

| | | | |
|---|---|---|---|
| 4,292,580 A | 9/1981 | Ott et al. | |
| 5,175,732 A | 12/1992 | Hendel et al. | |
| 5,440,723 A | 8/1995 | Arnold et al. | |
| 5,490,249 A | 2/1996 | Miller | |
| 5,537,540 A | 7/1996 | Miller et al. | |
| 5,603,027 A | 2/1997 | Ohkami | |
| 5,657,473 A | 8/1997 | Killean et al. | |
| 5,842,002 A | 11/1998 | Schnurer et al. | |
| 5,978,917 A | 11/1999 | Chi | |
| 6,088,803 A | 7/2000 | Tso et al. | |
| 6,094,677 A | 7/2000 | Capek et al. | |
| 6,108,799 A | 8/2000 | Boulay et al. | |
| 6,269,330 B1 | 7/2001 | Cidon et al. | |
| 6,272,641 B1 | 8/2001 | Ji | |

(Continued)

FOREIGN PATENT DOCUMENTS

| | | |
|---|---|---|
| GB | 2439806 | 1/2008 |
| GB | 2490431 | 10/2012 |

(Continued)

OTHER PUBLICATIONS

Zhang et al., The Effects of Threading, Infection Time, and Multiple-Attacker Collaboration on Malware Propagation, Sep. 2009, IEEE 28th International Symposium on Reliable Distributed Systems, pp. 73-82.*

(Continued)

*Primary Examiner* — Taghi Arani
*Assistant Examiner* — Kenneth Chang
(74) *Attorney, Agent, or Firm* — Blakely, Sokoloff, Taylor & Zafman LLP

(57) ABSTRACT

Techniques for detecting malicious attacks may monitor activities during execution of content (e.g., network downloads and email) to identify an instruction backdoor on a computer. An instruction backdoor is malware that opens a port for listening for instructions from a remote server. Such instructions may trigger activation of malicious activity. These techniques employ virtual machines that, in a controlled and monitored environment, permit content, when loaded and executed, to open ports. When those ports are not the authorized ones used for communications by known programs installed on the computer, an instruction backdoor is discovered.

39 Claims, 10 Drawing Sheets

(56) References Cited

U.S. PATENT DOCUMENTS

| | | |
|---|---|---|
| 6,279,113 B1 | 8/2001 | Vaidya |
| 6,298,445 B1 | 10/2001 | Shostack |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,100,201 B2 | 8/2006 | Izatt |
| 7,107,617 B2 | 9/2006 | Hursey et al. |
| 7,159,149 B2 | 1/2007 | Spiegel et al. |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,251,215 B1 | 7/2007 | Turner et al. |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson et al. |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,516,488 B1 | 4/2009 | Kienzle et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B2 | 4/2011 | Petersen |
| 7,937,761 B1 | 5/2011 | Benett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards et al. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,812 B1 | 3/2014 | Ranjan |
| 8,695,096 B1 | 4/2014 | Zhang |
| 8,713,631 B1 | 4/2014 | Pavlyushchik |

(56) References Cited

U.S. PATENT DOCUMENTS

| | | | |
|---|---|---|---|
| 8,713,681 | B2 | 4/2014 | Silberman et al. |
| 8,726,392 | B1 | 5/2014 | McCorkendale et al. |
| 8,782,792 | B1 | 7/2014 | Bodke |
| 8,789,172 | B2 | 7/2014 | Stolfo et al. |
| 8,789,178 | B2 | 7/2014 | Kejriwal et al. |
| 8,805,947 | B1 | 8/2014 | Kuzkin et al. |
| 8,806,647 | B1 | 8/2014 | Daswani et al. |
| 8,850,570 | B1 | 9/2014 | Ramzan |
| 8,850,571 | B2 | 9/2014 | Staniford et al. |
| 2001/0005889 | A1 | 6/2001 | Albrecht |
| 2001/0047326 | A1 | 11/2001 | Broadbent et al. |
| 2002/0018903 | A1 | 2/2002 | Kokubo et al. |
| 2002/0038430 | A1 | 3/2002 | Edwards et al. |
| 2002/0091819 | A1 | 7/2002 | Melchione et al. |
| 2002/0095607 | A1 | 7/2002 | Lin-Hendel |
| 2002/0144156 | A1* | 10/2002 | Copeland, III ............... 713/201 |
| 2002/0162015 | A1 | 10/2002 | Tang |
| 2002/0166063 | A1 | 11/2002 | Lachman et al. |
| 2002/0169952 | A1 | 11/2002 | DiSanto et al. |
| 2002/0184528 | A1 | 12/2002 | Shevenell et al. |
| 2002/0188887 | A1 | 12/2002 | Largman et al. |
| 2002/0194490 | A1 | 12/2002 | Halperin et al. |
| 2003/0074578 | A1 | 4/2003 | Ford et al. |
| 2003/0084318 | A1 | 5/2003 | Schertz |
| 2003/0101381 | A1 | 5/2003 | Mateev et al. |
| 2003/0115483 | A1 | 6/2003 | Liang |
| 2003/0188190 | A1 | 10/2003 | Aaron et al. |
| 2003/0191957 | A1 | 10/2003 | Hypponen et al. |
| 2003/0200460 | A1 | 10/2003 | Morota et al. |
| 2003/0212902 | A1 | 11/2003 | Van Der Made |
| 2003/0229801 | A1 | 12/2003 | Kouznetsov et al. |
| 2003/0237000 | A1 | 12/2003 | Denton et al. |
| 2004/0003323 | A1 | 1/2004 | Bennett et al. |
| 2004/0015712 | A1 | 1/2004 | Szor |
| 2004/0019832 | A1 | 1/2004 | Arnold et al. |
| 2004/0047356 | A1 | 3/2004 | Bauer |
| 2004/0083408 | A1 | 4/2004 | Spiegel et al. |
| 2004/0093513 | A1 | 5/2004 | Cantrell et al. |
| 2004/0111531 | A1 | 6/2004 | Staniford et al. |
| 2004/0128355 | A1 | 7/2004 | Chao et al. |
| 2004/0165588 | A1 | 8/2004 | Pandya |
| 2004/0236963 | A1 | 11/2004 | Danford et al. |
| 2004/0243349 | A1 | 12/2004 | Greifeneder et al. |
| 2004/0249911 | A1 | 12/2004 | Alkhatib et al. |
| 2004/0255161 | A1 | 12/2004 | Cavanaugh |
| 2004/0268147 | A1 | 12/2004 | Wiederin et al. |
| 2005/0021740 | A1 | 1/2005 | Bar et al. |
| 2005/0033960 | A1 | 2/2005 | Vialen et al. |
| 2005/0033989 | A1 | 2/2005 | Poletto et al. |
| 2005/0050148 | A1 | 3/2005 | Mohammadioun et al. |
| 2005/0086523 | A1 | 4/2005 | Zimmer et al. |
| 2005/0091513 | A1 | 4/2005 | Mitomo et al. |
| 2005/0091533 | A1 | 4/2005 | Omote et al. |
| 2005/0091652 | A1 | 4/2005 | Ross et al. |
| 2005/0108562 | A1 | 5/2005 | Khazan et al. |
| 2005/0114663 | A1 | 5/2005 | Cornell et al. |
| 2005/0125195 | A1 | 6/2005 | Brendel |
| 2005/0149726 | A1 | 7/2005 | Joshi et al. |
| 2005/0157662 | A1 | 7/2005 | Bingham et al. |
| 2005/0183143 | A1 | 8/2005 | Anderholm et al. |
| 2005/0201297 | A1 | 9/2005 | Peikari |
| 2005/0210533 | A1 | 9/2005 | Copeland et al. |
| 2005/0238005 | A1 | 10/2005 | Chen et al. |
| 2005/0240781 | A1 | 10/2005 | Gassoway |
| 2005/0265331 | A1 | 12/2005 | Stolfo |
| 2005/0283839 | A1 | 12/2005 | Cowburn |
| 2006/0010495 | A1 | 1/2006 | Cohen et al. |
| 2006/0015715 | A1 | 1/2006 | Anderson |
| 2006/0015747 | A1 | 1/2006 | Van de Ven |
| 2006/0021029 | A1 | 1/2006 | Brickell et al. |
| 2006/0021054 | A1 | 1/2006 | Costa et al. |
| 2006/0031476 | A1 | 2/2006 | Mathes et al. |
| 2006/0047665 | A1 | 3/2006 | Neil |
| 2006/0070130 | A1 | 3/2006 | Costea et al. |
| 2006/0075496 | A1 | 4/2006 | Carpenter et al. |
| 2006/0095968 | A1 | 5/2006 | Portolani et al. |
| 2006/0101516 | A1 | 5/2006 | Sudaharan et al. |
| 2006/0101517 | A1 | 5/2006 | Banzhof et al. |
| 2006/0117385 | A1 | 6/2006 | Mester et al. |
| 2006/0123477 | A1 | 6/2006 | Raghavan et al. |
| 2006/0143709 | A1 | 6/2006 | Brooks et al. |
| 2006/0150249 | A1 | 7/2006 | Gassen et al. |
| 2006/0161983 | A1 | 7/2006 | Cothrell et al. |
| 2006/0161987 | A1 | 7/2006 | Levy-Yurista |
| 2006/0161989 | A1 | 7/2006 | Reshef et al. |
| 2006/0164199 | A1 | 7/2006 | Gilde et al. |
| 2006/0173992 | A1 | 8/2006 | Weber et al. |
| 2006/0179147 | A1 | 8/2006 | Tran et al. |
| 2006/0184632 | A1 | 8/2006 | Marino et al. |
| 2006/0191010 | A1 | 8/2006 | Benjamin |
| 2006/0221956 | A1 | 10/2006 | Narayan et al. |
| 2006/0236393 | A1 | 10/2006 | Kramer et al. |
| 2006/0242709 | A1 | 10/2006 | Seinfeld et al. |
| 2006/0248519 | A1 | 11/2006 | Jaeger et al. |
| 2006/0248582 | A1 | 11/2006 | Panjwani et al. |
| 2006/0251104 | A1 | 11/2006 | Koga |
| 2006/0288417 | A1 | 12/2006 | Bookbinder et al. |
| 2007/0006288 | A1 | 1/2007 | Mayfield et al. |
| 2007/0006313 | A1 | 1/2007 | Porras et al. |
| 2007/0011174 | A1 | 1/2007 | Takaragi et al. |
| 2007/0016951 | A1 | 1/2007 | Piccard et al. |
| 2007/0033645 | A1 | 2/2007 | Jones |
| 2007/0038943 | A1 | 2/2007 | FitzGerald et al. |
| 2007/0064689 | A1 | 3/2007 | Shin et al. |
| 2007/0074169 | A1 | 3/2007 | Chess et al. |
| 2007/0094730 | A1 | 4/2007 | Bhikkaji et al. |
| 2007/0101435 | A1 | 5/2007 | Konanka et al. |
| 2007/0143827 | A1 | 6/2007 | Nicodemus et al. |
| 2007/0156895 | A1 | 7/2007 | Vuong |
| 2007/0157180 | A1 | 7/2007 | Tillmann et al. |
| 2007/0157306 | A1 | 7/2007 | Elrod et al. |
| 2007/0168988 | A1 | 7/2007 | Eisner et al. |
| 2007/0171824 | A1 | 7/2007 | Ruello et al. |
| 2007/0174915 | A1 | 7/2007 | Gribble et al. |
| 2007/0192500 | A1 | 8/2007 | Lum |
| 2007/0192858 | A1 | 8/2007 | Lum |
| 2007/0198275 | A1 | 8/2007 | Malden et al. |
| 2007/0208822 | A1 | 9/2007 | Wang et al. |
| 2007/0220607 | A1 | 9/2007 | Sprosts et al. |
| 2007/0240218 | A1 | 10/2007 | Tuvell et al. |
| 2007/0240219 | A1 | 10/2007 | Tuvell et al. |
| 2007/0240220 | A1 | 10/2007 | Tuvell et al. |
| 2007/0240222 | A1 | 10/2007 | Tuvell et al. |
| 2007/0250930 | A1 | 10/2007 | Aziz et al. |
| 2007/0271446 | A1 | 11/2007 | Nakamura |
| 2008/0005782 | A1 | 1/2008 | Aziz |
| 2008/0028463 | A1 | 1/2008 | Dagon et al. |
| 2008/0040710 | A1 | 2/2008 | Chiriac |
| 2008/0046781 | A1 | 2/2008 | Childs et al. |
| 2008/0072326 | A1 | 3/2008 | Danford et al. |
| 2008/0077793 | A1 | 3/2008 | Tan et al. |
| 2008/0080518 | A1 | 4/2008 | Hoeflin et al. |
| 2008/0086720 | A1 | 4/2008 | Lekel |
| 2008/0098476 | A1 | 4/2008 | Syversen |
| 2008/0120722 | A1 | 5/2008 | Sima et al. |
| 2008/0134178 | A1 | 6/2008 | Fitzgerald et al. |
| 2008/0134334 | A1 | 6/2008 | Kim et al. |
| 2008/0141376 | A1 | 6/2008 | Clausen et al. |
| 2008/0184373 | A1 | 7/2008 | Traut et al. |
| 2008/0189787 | A1 | 8/2008 | Arnold et al. |
| 2008/0201778 | A1 | 8/2008 | Guo et al. |
| 2008/0209557 | A1 | 8/2008 | Herley et al. |
| 2008/0215742 | A1 | 9/2008 | Goldszmidt et al. |
| 2008/0222728 | A1 | 9/2008 | Chavez et al. |
| 2008/0222729 | A1 | 9/2008 | Chen et al. |
| 2008/0263665 | A1 | 10/2008 | Ma et al. |
| 2008/0295172 | A1 | 11/2008 | Bohacek |
| 2008/0301810 | A1 | 12/2008 | Lehane et al. |
| 2008/0307524 | A1 | 12/2008 | Singh et al. |
| 2008/0313738 | A1 | 12/2008 | Enderby |
| 2008/0320594 | A1 | 12/2008 | Jiang |
| 2009/0007100 | A1 | 1/2009 | Field et al. |

(56) References Cited

U.S. PATENT DOCUMENTS

| | | | |
|---|---|---|---|
| 2009/0013408 A1 | 1/2009 | Schipka | |
| 2009/0031423 A1 | 1/2009 | Liu et al. | |
| 2009/0036111 A1 | 2/2009 | Danford et al. | |
| 2009/0037835 A1 | 2/2009 | Goldman | |
| 2009/0044024 A1 | 2/2009 | Oberheide et al. | |
| 2009/0044274 A1 | 2/2009 | Budko et al. | |
| 2009/0064332 A1* | 3/2009 | Porras et al. | 726/23 |
| 2009/0077666 A1* | 3/2009 | Chen et al. | 726/25 |
| 2009/0083369 A1 | 3/2009 | Marmor | |
| 2009/0083855 A1 | 3/2009 | Apap et al. | |
| 2009/0089879 A1 | 4/2009 | Wang et al. | |
| 2009/0094697 A1 | 4/2009 | Provos et al. | |
| 2009/0113425 A1 | 4/2009 | Ports et al. | |
| 2009/0125976 A1 | 5/2009 | Wassermann et al. | |
| 2009/0126015 A1 | 5/2009 | Monastyrsky et al. | |
| 2009/0126016 A1 | 5/2009 | Sobko et al. | |
| 2009/0133125 A1 | 5/2009 | Choi et al. | |
| 2009/0144823 A1 | 6/2009 | Lamastra et al. | |
| 2009/0158430 A1 | 6/2009 | Borders | |
| 2009/0172815 A1* | 7/2009 | Gu et al. | 726/23 |
| 2009/0187992 A1 | 7/2009 | Poston | |
| 2009/0193293 A1 | 7/2009 | Stolfo et al. | |
| 2009/0199296 A1 | 8/2009 | Xie et al. | |
| 2009/0228233 A1 | 9/2009 | Anderson et al. | |
| 2009/0241187 A1 | 9/2009 | Troyansky | |
| 2009/0241190 A1 | 9/2009 | Todd et al. | |
| 2009/0265692 A1 | 10/2009 | Godefroid et al. | |
| 2009/0271867 A1 | 10/2009 | Zhang | |
| 2009/0300415 A1 | 12/2009 | Zhang et al. | |
| 2009/0300761 A1 | 12/2009 | Park et al. | |
| 2009/0328185 A1 | 12/2009 | Berg et al. | |
| 2009/0328221 A1 | 12/2009 | Blumfield et al. | |
| 2010/0005146 A1 | 1/2010 | Drako et al. | |
| 2010/0011205 A1 | 1/2010 | McKenna | |
| 2010/0017546 A1 | 1/2010 | Poo et al. | |
| 2010/0031353 A1 | 2/2010 | Thomas et al. | |
| 2010/0037314 A1 | 2/2010 | Perdisci et al. | |
| 2010/0043073 A1 | 2/2010 | Kuwamura | |
| 2010/0054278 A1 | 3/2010 | Stolfo et al. | |
| 2010/0058474 A1 | 3/2010 | Hicks | |
| 2010/0064044 A1 | 3/2010 | Nonoyama | |
| 2010/0077481 A1 | 3/2010 | Polyakov et al. | |
| 2010/0083376 A1 | 4/2010 | Pereira et al. | |
| 2010/0100718 A1 | 4/2010 | Srinivasan | |
| 2010/0115621 A1 | 5/2010 | Staniford et al. | |
| 2010/0132038 A1 | 5/2010 | Zaitsev | |
| 2010/0154056 A1 | 6/2010 | Smith et al. | |
| 2010/0192223 A1 | 7/2010 | Ismael et al. | |
| 2010/0220863 A1 | 9/2010 | Dupaquis et al. | |
| 2010/0235831 A1 | 9/2010 | Dittmer | |
| 2010/0251104 A1 | 9/2010 | Massand | |
| 2010/0281102 A1 | 11/2010 | Chinta et al. | |
| 2010/0281541 A1 | 11/2010 | Stolfo et al. | |
| 2010/0281542 A1 | 11/2010 | Stolfo et al. | |
| 2010/0287260 A1 | 11/2010 | Peterson et al. | |
| 2010/0306173 A1 | 12/2010 | Frank | |
| 2011/0004737 A1 | 1/2011 | Greenebaume | |
| 2011/0025504 A1 | 2/2011 | Lyon et al. | |
| 2011/0041179 A1 | 2/2011 | Stahlberg | |
| 2011/0047594 A1 | 2/2011 | Mahaffey et al. | |
| 2011/0047620 A1 | 2/2011 | Mahaffey et al. | |
| 2011/0055907 A1 | 3/2011 | Narasimhan et al. | |
| 2011/0078794 A1 | 3/2011 | Manni et al. | |
| 2011/0093951 A1 | 4/2011 | Aziz | |
| 2011/0099620 A1 | 4/2011 | Stavrou et al. | |
| 2011/0099633 A1 | 4/2011 | Aziz | |
| 2011/0113231 A1 | 5/2011 | Kaminsky | |
| 2011/0145918 A1 | 6/2011 | Jung et al. | |
| 2011/0145920 A1 | 6/2011 | Mahaffey et al. | |
| 2011/0145934 A1 | 6/2011 | Abramovici et al. | |
| 2011/0167493 A1 | 7/2011 | Song et al. | |
| 2011/0167494 A1 | 7/2011 | Bowen et al. | |
| 2011/0173460 A1 | 7/2011 | Ito et al. | |
| 2011/0219450 A1 | 9/2011 | McDougal et al. | |
| 2011/0225624 A1 | 9/2011 | Sawhney et al. | |
| 2011/0225655 A1 | 9/2011 | Niemela et al. | |
| 2011/0247072 A1 | 10/2011 | Staniford et al. | |
| 2011/0265182 A1 | 10/2011 | Peinado et al. | |
| 2011/0289582 A1 | 11/2011 | Kejriwal et al. | |
| 2011/0302587 A1 | 12/2011 | Nishikawa et al. | |
| 2011/0307954 A1 | 12/2011 | Melnik et al. | |
| 2011/0307955 A1 | 12/2011 | Kaplan et al. | |
| 2011/0307956 A1 | 12/2011 | Yermakov et al. | |
| 2011/0314546 A1 | 12/2011 | Aziz et al. | |
| 2012/0023593 A1* | 1/2012 | Puder et al. | 726/28 |
| 2012/0054869 A1 | 3/2012 | Yen et al. | |
| 2012/0066698 A1 | 3/2012 | Yanoo | |
| 2012/0079596 A1 | 3/2012 | Thomas et al. | |
| 2012/0084859 A1 | 4/2012 | Radinsky et al. | |
| 2012/0110667 A1 | 5/2012 | Zubrilin et al. | |
| 2012/0117652 A1 | 5/2012 | Manni et al. | |
| 2012/0124426 A1 | 5/2012 | Maybee et al. | |
| 2012/0174186 A1 | 7/2012 | Aziz et al. | |
| 2012/0174196 A1* | 7/2012 | Bhogavilli et al. | 726/5 |
| 2012/0174218 A1 | 7/2012 | McCoy et al. | |
| 2012/0198279 A1 | 8/2012 | Schroeder | |
| 2012/0210423 A1 | 8/2012 | Friedrichs et al. | |
| 2012/0222121 A1 | 8/2012 | Staniford et al. | |
| 2012/0255015 A1 | 10/2012 | Sahita et al. | |
| 2012/0255017 A1 | 10/2012 | Sallam | |
| 2012/0260342 A1 | 10/2012 | Dube et al. | |
| 2012/0266244 A1 | 10/2012 | Green et al. | |
| 2012/0278886 A1 | 11/2012 | Luna | |
| 2012/0297489 A1 | 11/2012 | Dequevy | |
| 2012/0330801 A1 | 12/2012 | McDougal et al. | |
| 2013/0014259 A1 | 1/2013 | Gribble et al. | |
| 2013/0036472 A1 | 2/2013 | Aziz | |
| 2013/0047257 A1 | 2/2013 | Aziz | |
| 2013/0074185 A1 | 3/2013 | McDougal et al. | |
| 2013/0086684 A1 | 4/2013 | Mohler | |
| 2013/0097699 A1 | 4/2013 | Balupari et al. | |
| 2013/0097706 A1 | 4/2013 | Titonis et al. | |
| 2013/0111587 A1 | 5/2013 | Goel et al. | |
| 2013/0117852 A1 | 5/2013 | Stute | |
| 2013/0117855 A1 | 5/2013 | Kim et al. | |
| 2013/0139264 A1 | 5/2013 | Brinkley et al. | |
| 2013/0160125 A1 | 6/2013 | Likhachev et al. | |
| 2013/0160127 A1 | 6/2013 | Jeong et al. | |
| 2013/0160130 A1 | 6/2013 | Mendelev et al. | |
| 2013/0160131 A1 | 6/2013 | Madou et al. | |
| 2013/0167236 A1 | 6/2013 | Sick | |
| 2013/0174214 A1 | 7/2013 | Duncan | |
| 2013/0185795 A1* | 7/2013 | Winn et al. | 726/23 |
| 2013/0185798 A1 | 7/2013 | Saunders et al. | |
| 2013/0191915 A1 | 7/2013 | Antonakakis et al. | |
| 2013/0196649 A1 | 8/2013 | Paddon et al. | |
| 2013/0227691 A1 | 8/2013 | Aziz et al. | |
| 2013/0246370 A1 | 9/2013 | Bartram et al. | |
| 2013/0263260 A1 | 10/2013 | Mahaffey at al. | |
| 2013/0291109 A1 | 10/2013 | Staniford et al. | |
| 2013/0298243 A1 | 11/2013 | Kumar et al. | |
| 2014/0053260 A1 | 2/2014 | Gupta et al. | |
| 2014/0053261 A1 | 2/2014 | Gupta et al. | |
| 2014/0130158 A1 | 5/2014 | Wang et al. | |
| 2014/0137180 A1 | 5/2014 | Lukacs et al. | |
| 2014/0169762 A1 | 6/2014 | Ryu | |
| 2014/0179360 A1 | 6/2014 | Jackson et al. | |
| 2014/0328204 A1 | 11/2014 | Klotsche et al. | |
| 2014/0351935 A1 | 11/2014 | Shao et al. | |

FOREIGN PATENT DOCUMENTS

| | | |
|---|---|---|
| WO | WO-02/06928 | 1/2002 |
| WO | WO-02/23805 | 3/2002 |
| WO | WO 2007/022454 | 2/2007 |
| WO | WO-2007-117636 | 10/2007 |
| WO | WO-2008/041950 | 4/2008 |
| WO | WO 2008/084259 | 7/2008 |
| WO | WO-2011/084431 | 7/2011 |
| WO | WO 2011/112348 | 9/2011 |
| WO | WO 2012/075336 | 6/2012 |

(56) References Cited

FOREIGN PATENT DOCUMENTS

| | | |
|---|---|---|
| WO | WO-2012145066 | 10/2012 |
| WO | WO 2013/067505 | 5/2013 |

OTHER PUBLICATIONS

Wahid et al., Characterising the Evolution in Scanning Activity of Suspicious Hosts, Oct. 2009, Third International Conference on Network and System Security, pp. 344-350.*
IEEE Xplore Digital Library Sear Results for "*detection of unknown computer worms*". Http//ieeexplore.ieee.org/searchresult. jsp?SortField=Score&SortOrder=desc&ResultC . . . , (Accessed on Aug. 28, 2009).
AltaVista Advanced Search Results. "*Event Orchestrator*". Http://www.altavista.com/web/results?Itag=ody&pg=aq &aqmode=aqa=Event+Orchesrator . . . , (Accessed on Sep. 3, 2009).
AltaVista Advanced Search Results. "*attack vector identifier*". Http://www.altavista.com/web/results?Itag=ody&pg=aq &aqmode=aqa=Event+Orchestrator . . . , (Accessed on Sep. 15, 2009).
Cisco, *Configuring the Catalyst Switched Port Analyzer* (SPAN) ("Cisco"), (1992-2003).
Reiner Sailer, Enriquillo Valdez, Trent Jaeger, Roonald Perez, Leendert van Doorn, John Linwood Griffin, Stefan Berger., *sHype: Secure Hypervisor Appraoch to Trusted Virtualized Systems* (Feb. 2, 2005) ("Sailer").
Excerpt regarding First Printing Date for Merike Kaeo, *Designing Network Security*("Kaeo"), (2005).
*The Sniffers's Guide to Raw Traffic* available at: yuba.stanford.edu/~casado/pcap/section1.html, Jan. 6, 2014).
"Network Security: NetDetector—Network Intrusion Forensic System (NIFS) Whitepaper", "*NetDetector Whitepaper*"), (2003).
"Packet", *Microsoft Computer Dictionary, Microsoft Press*, (Mar. 2002), 1 page.
"When Virtual is Better Than Real", *IEEEXplore Digital Library*, available at, http://ieeexplore.ieee.org/xpl/articleDetails. jsp?reload=true&arnumber=990073, (Dec. 7, 2013).
Abdullah, et al., Visualizing Network Data for Intrusion Detection, *2005 IEEE Workshop on Information Assurance and Security*, pp. 100-108.
Adetoye, Adedayo , et al., "Network Intrusion Detection & Response System", ("Adetoye"), (Sep. 2003).
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", *Springer-verlag Berlin Heidelberg*, (2006), pp. 165-184.
Bayer, et al., "Dynamic Analysis of Malicious Code", *J Comput Virol*, Springer-Verlag, France., (2006), pp. 67-77.
Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).
Chaudet, C. , et al., "Optimal Positioning of Active and Passive Monitoring Devices", *International Conference on Emerging Networking Experiments and Technologies, Proceedings of the 2005 ACM Conference on Emerging Network Experiment and Technology*, CoNEXT '05, Touloursse, France, (Oct. 2005), pp. 71-82.
Cohen, M.I. , "PyFlag—An advanced network forensic framework", *Digital investigation 5*, Elsevier, (2008), pp. S112-S120.
Costa, M. , et al., "Vigilante: End-to-End Containment of Internet Worms", *SOSP '05, Association for Computing Machinery, Inc.*, Brighton U.K., (Oct. 23-26, 2005).
Crandall, J.R. , et al., "Minos:Control Data Attack Prevention Orthogonal to Memory Model", *37th International Symposium on Microarchitecture*, Portland, Oregon, (Dec. 2004).
Deutsch, P. , "Zlib compressed data format specification version 3.3" RFC 1950, (1996).
Distler, "Malware Analysis: An Introduction", *SANS Institute InfoSec Reading Room*, SANS Institute, (2007).
Dunlap, George W. et al., "ReVirt: Enabling Intrusion Analysis through Virtual-Machine Logging and Replay", *Proceeding of the 5th Symposium on Operating Systems Design and Implementation, USENIX Association*, ("Dunlap"), (Dec. 9, 2002).
Filiol, Eric , et al., "Combinatorial Optimisation of Worm Propagation on an Unknown Network", International Journal of Computer Science 2.2 (2007).
Goel, et al., *Reconstructing System State for Intrusion Analysis*, Apr. 2008 *SIGOPS Operating Systems Review*, vol. 42 Issue 3, pp. 21-28.
Hjelmvik, Erik , "Passive Network Security Analysis with NetworkMiner", *(IN)Secure*, Issue 18, (Oct. 2008), pp. 1-100.
Kaeo, Merike , "Designing Network Security", ("Kaeo"), (Nov. 2003).
Kim, H. , et al., "Autograph: Toward Automated, Distributed Worm Signature Detection", *Proceedings of the 13th Usenix Security Symposium* (Security 2004), San Diego, (Aug. 2004), pp. 271-286.
Krasnyansky, Max , et al., *Universal TUN/TAP driver*, available at https://www.kernel.org/doc/Documentation/networking/tuntap.txt (2002) ("Krasnyansky").
Kreibich, C. , et al., "Honeycomb-Creating Intrusion Detection Signatures Using Honeypots", *2nd Workshop on Hot Topics in Networks* (HotNets-11), Boston, USA, (2003).
Kristoff, J. , "Botnets, Detection and Mitigation: DNS-Based Techniques", *NU Security Day*, (2005), 23 pages.
Liljenstam, Michael et al., "Simulating Realistic Network Traffic for Worm Warning System Design and Testing", *Institute for Security Technology studies*, Dartmouth College, ("Liljenstam") (Oct. 27, 2003).
Marchette, David J., "Computer Intrusion Detection and Network Monitoring: A Statistical Viewpoint", "Marchette", (2001).
Margolis, P.E. , "Random House Webster's 'Computer & Internet Dictionary 3rd Edition'", ISBN 0375703519, (Dec. 1998).
Moore, D. , et al., "Internet Quarantine: Requirements for Containing Self-Propagating Code", *INFOCOM*, vol. 3, (Mar. 30-Apr. 3, 2003), pp. 1901-1910.
Morales, Jose A., et al., ""Analyzing and exploiting network behaviors of malware."", *Security and Privacy in Communication Networks. Springer Berlin Heidelberg*, 2010. 20-34.
Natvig, Kurt , "SANDBOXII: Internet", *Virus Bulletin Conference*, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J. , et al., "Dynamic Taint Analysis for Automatic Detection, Analysis, and Signature Generation of Exploits on Commodity Software", *In Proceedings of the 12th Annual Network and Distributed System Security, Symposium* (NDSS '05), (Feb. 2005).
Newsome, J. , et al., "Polygraph: Automatically Generating Signatures for Polymorphic Worms", *In Proceedings of the IEEE Symposium on Security and Privacy*, (May 2005).
Nojiri, D. , et al., "Cooperation Response Strategies for Large Scale Attack Mitigation", *DARPA Information Survivability Conference and Exposition*, vol. 1, (Apr. 22-24, 2003), pp. 293-302.
Silicon Defense, "Worm Containment in the Internal Network", (Mar. 2003), pp. 1-25.
Singh, S. , et al., "Automated Worm Fingerprinting", *Proceedings of the ACM/USENIX Symposium on Operating System Design and Implementation*, San Francisco, California, (Dec. 2004).
Spitzner, Lance , "Honeypots: Tracking Hackers", ("Spizner"), (Sep. 17, 2002).
Thomas H. Ptacek, and Timothy N. Newsham , "Insertion, Evasion, and Denial of Service: Eluding Network Intrusion Detection", *Secure Networks*, ("Ptacek"), (Jan. 1998).
Venezia, Paul , "NetDetector Captures Intrusions", *InfoWorld Issue 27*, ("Venezia"), (Jul. 14, 2003).
Whyte, et al., "DNS-Based Detection of Scanning Works in an Enterprise Network", *Proceedings of the 12th Annual Network and Distributed System Security Symposium*, (Feb. 2005), 15 pages.
Williamson, Matthew M., "Throttling Viruses: Restricting Propagation to Defeat Malicious Mobile Code", *ACSAC Conference*, Las Vegas, NV, USA, (Dec. 2002), pp. 1-9.
Rautiainen et al: "A look at Portable Document Format vulnerabilities", Information Security Technical Report Elsevier Advanced

(56) References Cited

OTHER PUBLICATIONS

Technology, Amsterdam, NL, vol. 14 No. 1, Feb. 1, 2009, pp. 30-33, XP026144094, ISSN: 1363-4127, DOI: 10.1016/J.ISTR.2009.04.001 [retrieved on May 8, 2009].

Didier Stevens: "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.

Anonymous: "Inside Adobe Reader Protected Mode—Part 1—Design", Oct. 5, 2010, XP055116424, Retrieved from the Internet: URL:http://blogs.adobe.com/security/2010/10/inside-adobe-reader-protected-mode-part-1-design.html [retrieved on May 6, 2014].

Adobe Systems Incorporated, "PDF 32000-1:2008, Document management—Portable document format—Part1:PDF 1.7", First Edition, Jul. 1, 2008, 756 pages.

Apostolopoulos, George; Hassapis, Constantinos; "V-eM: A Cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Baldi, Mario; Risso, Fulvio; "A Framework for Rapid Development and Portable Execution of Packet-Handling Applications", 5th IEEE International Symposium on Signal Processing and Information Technology, Dec. 21, 2005, pp. 233-238.

Gregg Keizer: "Microsoft's HoneyMonkeys Show Patching Windows Works", Aug. 8, 2005, XP055143386, Retrieved from the Internet: URL:https://web.archive.org/web/20121022220617/http://www.informationweek.com/microsofts-honeymonkeys-show-patching-wi/167600716 [retrieved on Sep. 29, 2014].

Idika et al., A-Survey-of-Malware-Detection-Techniques, Feb. 2, 2007, Department of Computer Science, Purdue University.

Bayer et al., Dynamic analysis of malicious code, 2006, Springer-Verlag France.

Mori, Detecting Unknown Computer Viruses, 2004, Springer-Verlag Berlin Heidelberg.

Oberheide et al., CloudAV_N-Version Antivirus in the Network Cloud, 17th USENIX Security Symposium USENIX Security '08 Jul. 28-Aug. 1, 2008 San Jose, CA.

Li et al., A VMM-Based System Call Interposition Framework for Program Monitoring, Dec. 2010, IEEE 16th International Conference on Parallel and Distributed Systems, pp. 706-711.

Clark, John, Sylvian Leblanc, and Scott Knight. "Risks associated with usb hardware trojan devices used by insiders." Systems Conference (SysCon), 2011 IEEE International. IEEE, 2011.

Gibler, Clint, et al. AndroidLeaks: automatically detecting potential privacy leaks in android applications on a large scale. Springer Berlin Heidelberg, 2012.

Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.

Lindorter, Martina, Clemens Kolbitsch, and Paolo Milani Comparetti. "Detecting environment-sensitive malware." Recent Advances in Intrusion Detection. Springer Berlin Heidelberg, 2011.

Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.

Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12-final107.pdf [retrieved on Dec. 15, 2014].

Yuhei Kawakoya et al: "Memory behavior-based automatic malware unpacking in stealth debugging environment", Malicious and Unwanted Software (Malware), 2010 5TH International Conference on, IEEE, Piscataway, NJ, USA, Oct. 19, 2010, pp. 39-46, XP031833827, ISBN:978-1-4244-8-9353-1.

\* cited by examiner

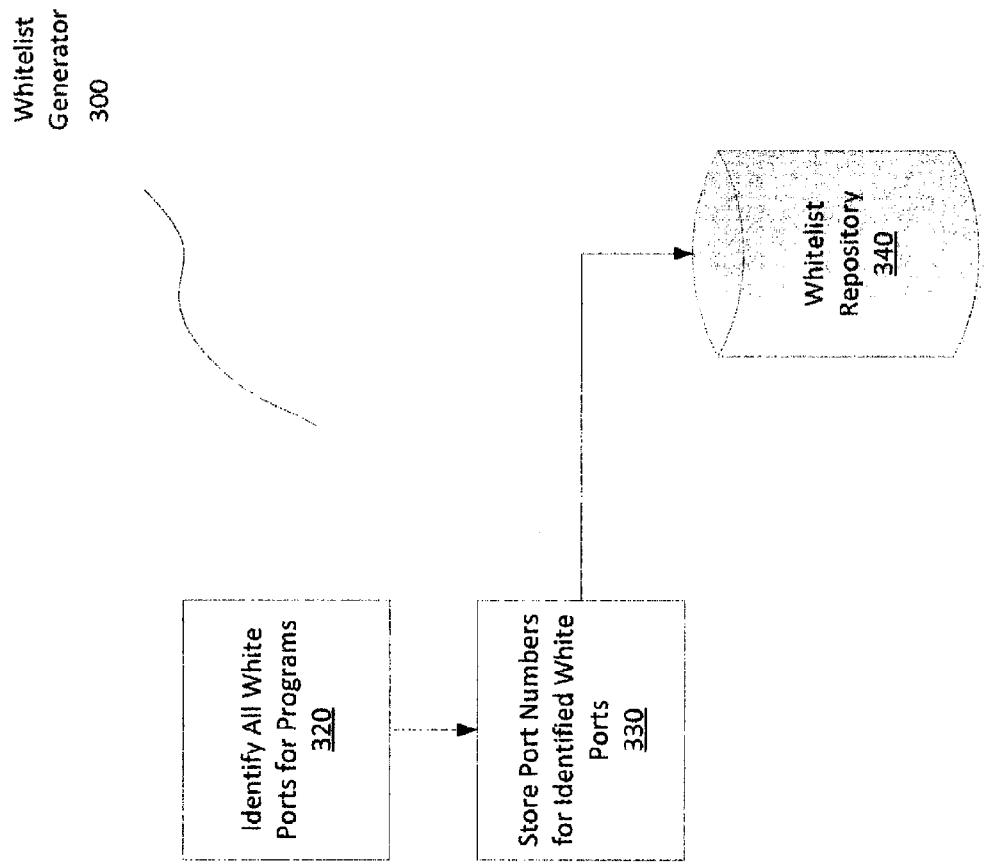

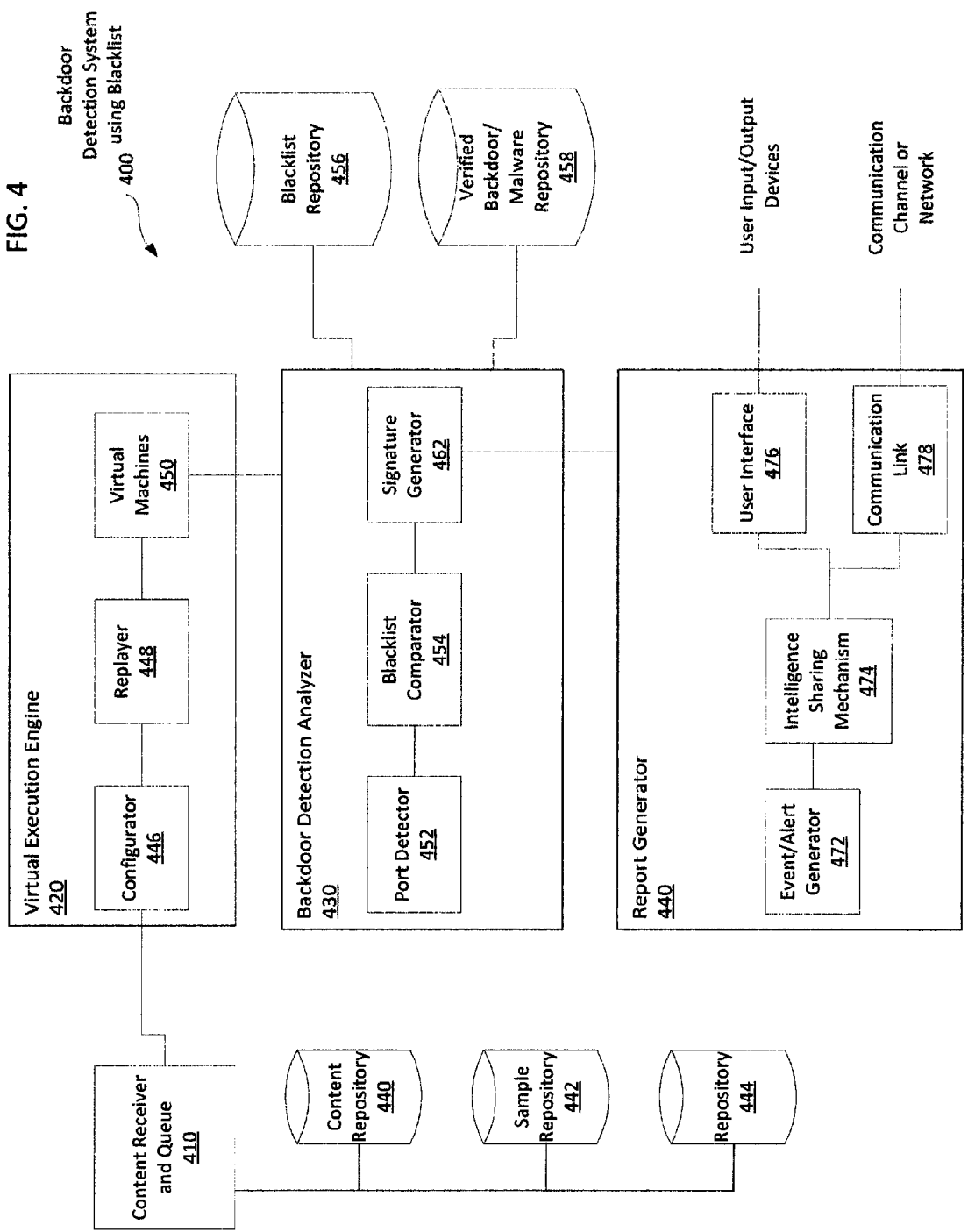

Method for Detecting Backdoors Using Blacklist 500

SYSTEMS AND METHODS FOR AUTOMATICALLY DETECTING BACKDOORS

BACKGROUND

1. Field of the Invention

The present invention relates generally to network security and more particularly to detecting malicious software operating in computers and other digital devices.

2. Related Art

Malicious software, or malware for short, may include any program or file that is harmful by design to a computer. Malware includes computer viruses, worms, Trojan horses, adware, spyware, and any programming that gathers information about a computer or its user or otherwise operates without permission. The owners of the computers are often unaware that these programs have been added to their computers and are often similarly unaware of their function.

Malicious network content is a type of malware distributed over a network via websites, e.g., servers operating on a network according to an HTTP standard or other well-known standard. Malicious network content distributed in this manner may be actively downloaded and installed on a computer, without the approval or knowledge of its user, simply by the computer accessing the web site hosting the malicious network content (the "malicious web site"). Malicious network content may be embedded within objects associated with web pages hosted by the malicious web site. Malicious network content may also enter a computer on receipt or opening of email. For example, email may contain an attachment, such as a PDF document, with embedded malicious executable programs. Furthermore, malicious content may exist in files contained in a computer memory or storage device, having infected those files through any of a variety of attack vectors.

Various processes and devices have been employed to prevent the problems associated with malicious content. For example, computers often run antivirus scanning software that scans a particular computer for viruses and other forms of malware. The scanning typically involves automatic detection of a match between content stored on the computer (or attached media) and a library or database of signatures of known malware. The scanning may be initiated manually or based on a schedule specified by a user or system administrator associated with the particular computer. Unfortunately, by the time malware is detected by the scanning software, some damage on the computer or loss of privacy may have already occurred, and the malware may have propagated from the infected computer to other computers. Additionally, it may take days or weeks for new signatures to be manually created, the scanning signature library updated and received for use by the scanning software, and the new signatures employed in new scans.

Moreover, anti-virus scanning utilities may have limited effectiveness to protect against all exploits by polymorphic malware. Polymorphic malware has the capability to mutate to defeat the signature match process while keeping its original malicious capabilities intact. Signatures generated to identify one form of a polymorphic virus may not match against a mutated form. Thus polymorphic malware is often referred to as a family of virus rather than a single virus, and improved anti-virus techniques to identify such malware families is desirable.

Another type of malware detection solution employs virtual environments to replay content within a sandbox established by virtual machines (VMs). Such solutions monitor the behavior of content during execution to detect anomalies that may signal the presence of malware. One such system offered by FireEye, Inc., the assignee of the present patent application, employs a two-phase malware detection approach to detect malware contained in network traffic monitored in real-time. In a first or "static" phase, a heuristic is applied to network traffic to identify and filter packets that appear suspicious in that they exhibit characteristics associated with malware. In a second or "dynamic" phase, the suspicious packets (and typically only the suspicious packets) are replayed within one or more virtual machines. For example, if a user is trying to download a file over a network, the file is extracted from the network traffic and analyzed in the virtual machine. The results of the analysis aids in determining whether the file is malicious. The two-phase malware detection solution may detect numerous types of malware and, even malware missed by other commercially available approaches. Through verification, the two-phase malware detection solution may also achieve a significant reduction of false positives relative to such other commercially available approaches. Dealing with false positives in malware detection may needlessly slow or interfere with download of network content or receipt of email, for example. This two-phase approach has even proven successful against many types of polymorphic malware and other forms of advanced persistent threats.

Further enhancement to malware detection effectiveness while avoiding false positives is desirable of course, particularly as malware developers continue to create new forms of exploits.

SUMMARY

Embodiments of the invention may automatically detect a type of malicious software running in a computer or other digital device called by the coined term "instruction backdoor." An instruction backdoor is malware that opens a communications channel, preferably, a communication port for listening for instructions or other communications from an external malicious computer system or program. Characteristically, the communications are effected in a clandestine fashion. For example, such instructions may trigger activation of or otherwise control a Trojan Horse or other "sleeper" virus, or otherwise direct activity of malicious code that has previously gained entry into the digital device through other means.

In some embodiments, detection of an instruction backdoor may be carried out within a virtual machine that mimics a real digital device and, in a controlled and monitored environment, permits content (whether network downloads, email, files or other objects), when loaded and executed therein, to open one or more local communication ports to listen for instructions from a supposed (decoy) external server or program. When those communication ports are not the authorized ones used for communications by programs installed on the digital device by its user or administrator, an instruction backdoor may be discovered. The inventors recognized that key to detecting instruction backdoors are "listened to" ports rather than ports involved in communication connections. Embodiments may monitor "listened to" ports in digital devices to detect instruction backdoors during normal operation or during diagnostic or forensic testing of the digital device. Upon detecting an instruction backdoor, embodiments of the invention may issue an alert, report the incident as malware, isolate the affected digital device from network communication, or take other steps to remediate.

Using backdoors of the type described herein as a keystone of malicious attack and exploit analysis may permit embodiments of the invention to detect disparate forms of malware, and even families of polymorphic virus that use the same communication mechanisms to obtain instructions and other communications in furtherance of their nefarious purposes.

BRIEF DESCRIPTION OF THE DRAWINGS

The invention will be more fully understood with reference to the following detailed description in conjunction with the drawings, of which:

FIG. 3A is flow chart, partially in block diagram form, of a method for generating a whitelist for use by the backdoor detection system of FIG. 1, in accordance with an illustrative embodiment of the invention;

FIG. 4 is a block diagram of a backdoor detection system in accordance with another illustrative embodiment of the invention;

DESCRIPTION OF ILLUSTRATIVE EMBODIMENTS

Introduction

Figure 1:
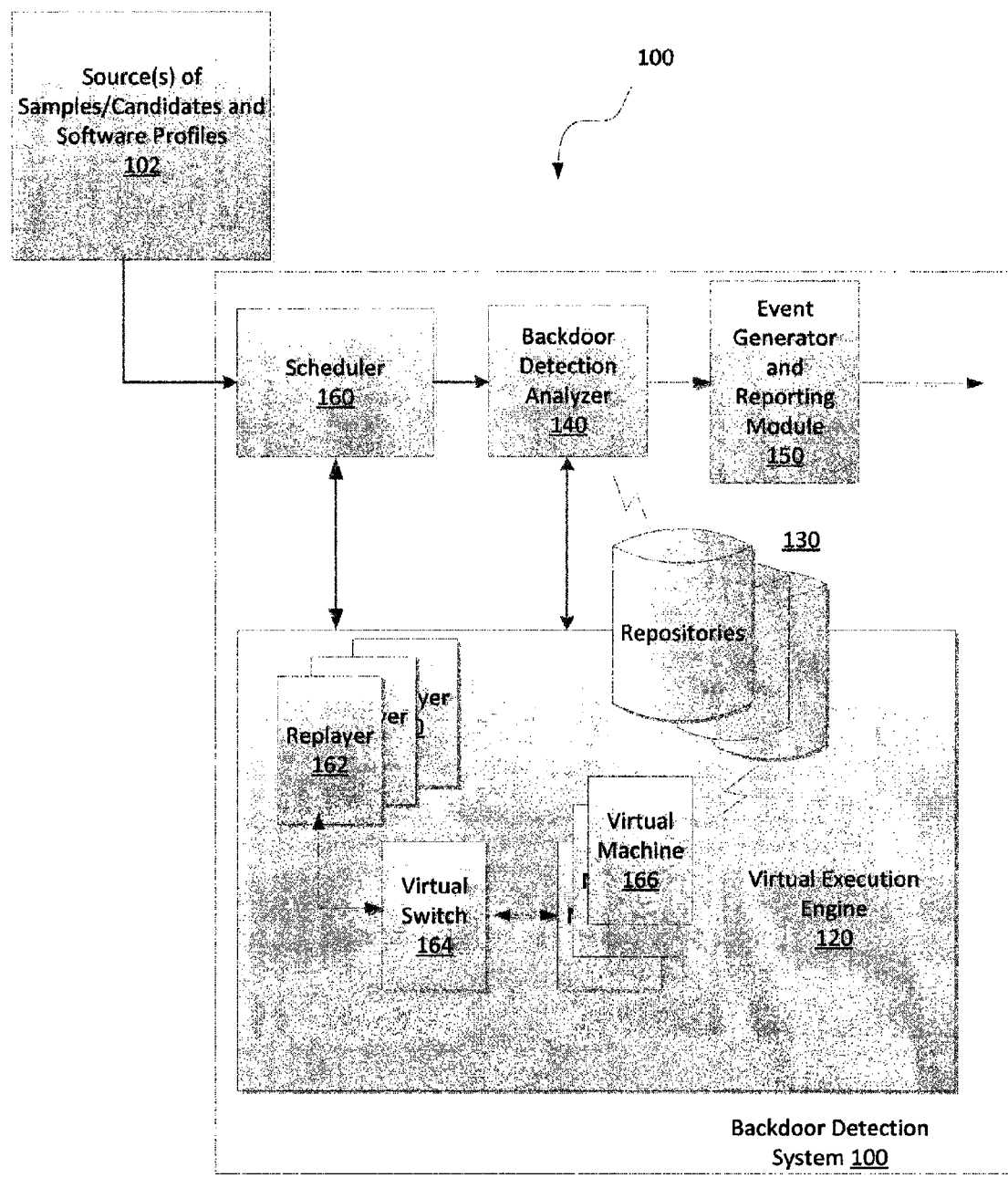
FIG. 1 is a block diagram of a backdoor detection system in accordance an illustrative embodiment of the invention.

Generally speaking, a backdoor is a type of (or part of) an active infiltration attack that uses an entry point into a digital device, whether an undocumented entry point or subverted use of a documented entry point. In so doing, the backdoor bypasses normal security and authentication mechanisms, and thereby achieves unauthorized, often remote access to the computer. A hallmark of backdoors is the manner by which they provide access is designed to remain undetected to the digital device's user and system/network administrators.

Generally herein, "instruction backdoor" will be used in the foregoing sense of being malware itself; it may also be viewed as denoting the instrumentality or mechanism associated with an attack, such as a communications channel or port, in which case detection of the instruction backdoor is tantamount to detecting an attack, leading to the conclusion that malware is present. This later sense should be regarded as merely a different perspective of the same concept, as will be apparent to those of skill in the art in light of this specification.

Also, while this specification often states that content comprising a malware candidate or test sample opens an instruction backdoor, it will be understood that this phrasing is intended to encompass the typical situation where a program processing content may open an instruction backdoor as a result of malicious code within the content. After all, it may be the program that sends system calls to open a port for listening, even a black port.

As used herein, a "digital device" may include any form or type of computer (such as a client, server, desk top, or notebook), mobile device (such as a smart phone or tablet) or other device, apparatus or system equipped for communications over a network (such as the Internet or an intranet). The terms "digital device" and "computer" or "computer system" may be used interchangeably herein, unless the context requires otherwise.

An instruction backdoor may be designed to use an otherwise innocuous local entry point on an affected digital device and subvert it for its own malicious purposes, often targeting a personal computer running Microsoft® Windows and Microsoft® Outlook. The entry point may allow instructions to be received from the network by malicious code executing on the digital device, which directs the malicious code for example to take surreptitious control of the digital device or a program installed thereon, or may install a new, unauthorized program. For example, the malware may be directed by a malicious external server to take control of electronic mail to spam junk emails from the infected computer, or to install and use data-gathering agents to steal sensitive personal, proprietary or even classified military or other governmental data.

Network content may include any data transmitted over a network. Network data may include text, software, images, audio, or other digital data. An example of network content includes web content, or any network data that may be transmitted using a Hypertext Transfer Protocol (HTTP), Hyper-Text Markup Language (HTML) protocol, other data transfer protocols, such as File Transfer Protocol (FTP), or be transmitted in a manner suitable for display on a web browser software application. Other examples of network content include email messages and Instant Messages. Network content may include one or more objects encapsulated in packets for communication. The packets may include a network header carrying information used for addressing, routing, and otherwise delivering the network content, and a data payload carrying the network content.

Discovery of an instruction backdoor in accordance with embodiments of the invention may involve execution of content constituting a malware candidate within a virtual environment. An illustrative technique may inspect a malware candidate and, in response, use a virtual machine configured to mimic a target computer or other digital device having a pre-determined software profile to detect the instruction backdoor. The software profile specifies at least one program and an operating system to be executed by the digital device. The malware candidate is then executed or replayed in the virtual machine, which may execute the specified program(s) and operating system in a virtualized environment and monitor the behavior of the program(s) during execution. Important to embodiments of the invention is that the monitored behavior may include attempts by any of the program(s) to open and listen to one or more ports provided by the virtual machine. As used herein, the terms computer program and application may be used interchangeably unless the context requires otherwise.

More specifically, embodiments of the invention employ a backdoor detection analyzer to identify a port number associated with each computer port at which the malware candidate is listening, if any, during its execution in the virtual machine and, in some embodiments, for purposes hereof, associated with only the "listened to" ports. Embodiments of the invention may detect attempts to open and listen to ports by intercepting system calls issued by the program to bind and listen to specific ports, or, alternatively, by reading data providing port number-process identifier (ID) associations stored by the operating system's network service module. It should be recalled that a process in this sense is an instance of a computer program being executed. The backdoor analyzer may then determine whether the identified port number of the port at which the malware candidate is listening is a "legal" or "white" port. This may be achieved through a look-up in a blacklist repository of ports that are not legal (i.e., "black ports") or, alternatively, in both a blacklist repository of black ports and a whitelist repository of white ports. The whitelist repository may store port numbers of white ports, which, in alternative embodiments, may include (a) ports that program(s) specified by the software profile may use for listening in accordance with their respective, associated protocols and applicable standards and specifications, or (b) ports that programs that generally run on digital devices of any relevant type or of a specific type (e.g., tablet computer or desktop) are authorized to use for listening. The blacklist repository may store port numbers of black ports, which, in alternative embodiments, may include (a) ports other than white ports, (b) ports that are opened for listening by known malware or a specific type of malware that the system is to detect, or (c) ports that satisfy both (a) and (b). "Known" malware is intended to encompass content that is verified to contain malware, such as through a verification process provided by embodiments of the invention described herein or by other reliable methodologies.

In some embodiments, if the malware candidate listens at a port whose port number is on the blacklist, the malware candidate is associated with a high probability of containing malware. In other embodiments, if the content listens at a port whose port number is on the blacklist and not on the whitelist, the malware candidate is associated with a high probability of containing malware. The latter embodiments provide a level of additional protection, since it may be deemed an error to have the port number on both the blacklist and whitelist, and its inclusion on both lists may require further review and testing. When a malware candidate is considered to have a high probability of being malware, it may be recommended that the content be treated as being malware for practical purposes to contain or eliminate the threat that it poses to the network, devices and/or data.

Embodiments of the invention may monitor communications channels in digital devices to detect instruction backdoors during normal operation or during diagnostic or testing. Utilities running in the background may monitor all ports during execution of programs, and perform look-ups in the appropriate repositories either in real time or off-line to detect instruction backdoors. The embodiments described herein may also be put into practice at malware forensic labs, whose purpose is to detect, verify and study malware candidates for any reason. Occasionally, the reason may involve prior, non-conclusive testing of the content by any of various known malware detection systems, including the commercially available systems and utilities described hereinabove. Another reason may involve analysis of malware candidates to identify a root cause of seemingly malicious harm suffered by one or more digital devices.

Accordingly, sources of content comprising malware candidates may be of various types, such as web pages, emails and files, as typically received by or stored in a digital device. The term, "sources," should be broadly construed. The content may be delivered to the backdoor detection system on a storage medium or may constitute portions of network traffic that underwent malware detection previously and require further analysis.

Embodiments of the backdoor detection system may be deployed as a stand-alone system or integrated into malware detection systems that examine and analyze other additional characteristics or attributes of the content that may indicate the presence of malware, such as, for example, malware signature scanning utilities or the afore-mentioned two-phase malware detection solutions. For example, the instruction backdoor detection mechanism described herein can be added to appliances and other systems for detecting malware, either by adding a virtual machine execution capability to such systems or by adding the appropriate aspects regarding port detection described herein to two-phase malware detection systems that already employ virtual execution environments.

Upon detecting an instruction backdoor, embodiments of the invention may issue an alert, report the incident as malware, isolate the affected digital device from network communication, or take other steps to remediate.

Ports, Listening and Connections

Since the constructs of computer ports, listening and connections are important to the understanding of embodiments of the invention, those constructs will now be described in greater detail.

As used herein, a port serves as a communications endpoint in a computer's operating system. A port is associated with an IP address of the computer, as well as the type of protocol used for communication. A port is a program-specific software construct, in that (i) each port provided by a computer's operating system may be uniquely associated at any point of time with a specific program running on the computer (or, in other words, the port is bound to the program), and (ii) plural ports may share a single physical connection to a packet switched network, such as, for example, the Internet.

For network communication, a computer forms packets for transmission by adding a destination port number to a destination computer's IP address to form the destination address for a communications session, and the destination address is then placed in the packets' headers. The data packets are placed on the network and routed across the network to the specified IP address, and then, upon reaching the destination computer having that IP address, are further routed to the specific process identified by the destination port number.

The TCP/IP protocol, for example, uses port numbers to identify both the sending and receiving end-points, called "internal sockets." Each side of a TCP connection has an associated, e.g., 16-bit, port number reserved by the sending or receiving program. Arriving TCP/IP data packets are identified as belonging to a specific TCP/IP connection by its sockets, that is, the combination of source address, source port, destination address, and destination port. The specifics of communications depend on the protocol, however, continuing the discussion with TCP/IP as the example, the steps involved in establishing a socket for communication between a server and client will next be described. A program running on a server creates a socket by issuing a SOCKET( ) system call to its operating system. Next, it binds the socket to an IP address using a BIND( ) system call specifying a port number on the host machine. Next, the server listens for connections with a LISTEN( ) system call. Afterwards, a program on another computer serving as a client may accept a connection with an ACCEPT( ) system call to its operating system. By doing so, the client connects with the server or, in other words, a connection is made. Thereupon, data may be sent and received between the server and client over the connection. The connection continues until closed at the end of the data transfer by exchanging control and acknowledgment packets between the server and client.

Accordingly, when a program running on a computer is waiting for another computer to connect with it, the program is said to be "listening" for connections or in a "listening state". In other words, the program (or at least an instance of the program) attaches or binds to a port of the computer on which it is executing and waits for a connection. Once a program binds itself to a port, that port cannot be used by any other program until communication has ended and the program has disconnected. When a remote computer connects to that particular port it is said to be "establishing" a connection and initiating a communication session between the two computers. The way it does this is set forth in applicable standards and specifications governing communications in the relevant protocol.

Thousands of ports are specified by communications-related "Requests for Comment" ("RFC"), Protocol Standards, and technical specification documents of software vendors, such as Microsoft, Inc. and Oracle Corp., of which far fewer are well known and widely used to identify specific types of protocols and services on a computer. The port numbers are assigned by the Internet Assigned Numbers Authority (IANA). Examples of well-known ports include: Ports 20 & 21 for File Transfer Protocol (FTP), Port 22 for Secure Shell (SSH), Port 23 for Telnet remote login service, Port 25 for Simple Mail Transfer Protocol (SMTP), Port 40 for TCP, Port 53 for Domain Name System (DNS) service, Port 80 for Hypertext Transfer Protocol (HTTP) used in the World Wide Web, Port 110 for Post Office Protocol (POP3), Port 161 for Simple Network Management Protocol (SNMP), and Port 443 for HTTP Secure (HTTPS).

A couple examples may prove useful. Web servers typically bind to the TCP/IP authorized port 80, which is what the HTTP protocol uses by default, and then will wait and "listen" for connections from remote devices. Once connected, the web server will send the requested web pages to the remote device and, when done, disconnect the connection. On the other hand, the remote device connecting to a web server may do this in reverse. The remote web browser may pick an available port in a seemingly random fashion from a range of port numbers authorized for the TCP/IP protocol, and attempt to connect to port 80 at the IP address of the web server. When the connection is established, the web browser may send a request for a particular web page and receive the requested web page from the web server. Afterwards, the two computers may disconnect the connection. Concurrent communications from both a web server and an FTP server may be established. An FTP server is a server that allows transfer to and receipt of files from remote computers under the FTP protocol. FTP servers typically use TCP ports 20 and 21 to send and receive information; therefore, an FTP server program may bind itself to TCP ports 20 or 21 to listen and wait for connections in order to send and receive data. It follows that such communications will not normally conflict with a web server running on TCP/IP port 80.

Backdoor Detection System

FIG. 1 depicts an illustrative backdoor detection system 100, in accordance with an embodiment of the invention, connected to one or more sources 102 providing content for malware testing. The backdoor detection system 100 includes a virtual execution engine 120 that replays content, storage repositories 130, backdoor detection analyzer 140 that analyzes behavior during replay, and reporting module 150 that provides results of the analysis.

Figure 2A:
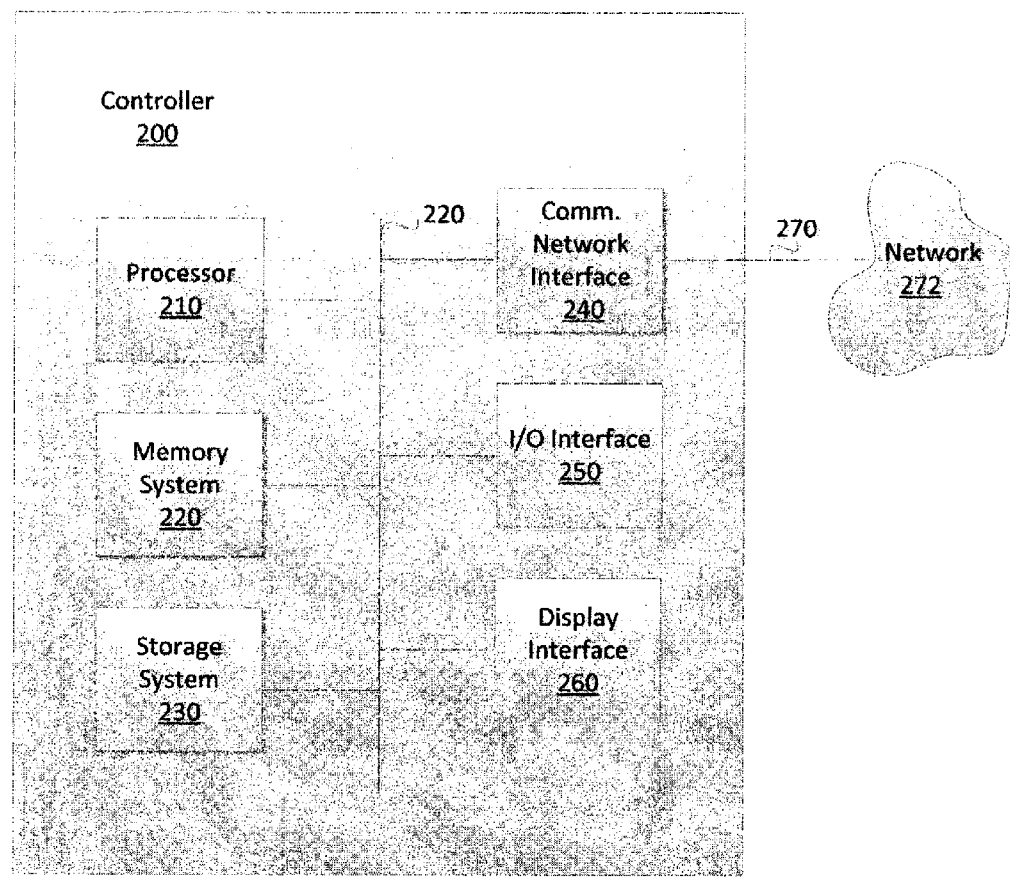
FIG. 2A is a block diagram of a controller for implementing the backdoor detection system of FIG. 1 in accordance with an illustrative embodiment of the invention.

The virtual execution engine 120 includes a scheduler 160, a replayer 162, a virtual switch 164, and at least one virtual machine 166. The scheduler 160 receives content (e.g., packets) from the source(s) 102, assigns an execution priority to the packets, and schedules the packets for execution by the virtual execution engine 120. The execution priority may be set automatically by default as "first in, first out" or may reflect a different order of execution indicative of a perceived seriousness of a malware issue. The priority may be set or modified by a user through a user interface such as a user interface 260 (FIG. 2A). The scheduler 160 may save or cache the packets, priority and associated schedule for execution in a repository, such as one of the repositories 130.

The scheduler 160 retrieves the packets from the repository in accordance with its schedule and provides them to the replayer 162, which sends them via the virtual switch 164 to the virtual machine 166 for execution (also known as "replay"). In some embodiments, the replayer 162 mimics the behavior of a server in transmitting them to the virtual machine 120, which mimics a client in a server-client model. There may be any number of replayers 162, each associated with and acting as a virtual server to one or more virtual machines 166. In a further embodiment, the replayer 162 may dynamically modify session variables, as appropriate, to emulate a "real" server of the content being replayed. In other embodiments, the replayer 162 furnishes the packets to a virtual machine, which simulates a stand-alone digital device, such as a server or client. The virtual switch 164 may route data packets to select ports of the virtual machine 166 that would normally be used for communication between a server and client for the applicable communication protocol, such as TCP/IP.

The virtual machine 166 includes a simulation of the digital device. In one embodiment, the scheduler 140 retrieves an instance of the virtual machine 166 from a pool of preferably concurrently existing virtual machine 166 which may be pre-configured to mimic a digital device in accordance with a software profile. The software profile specifies an operating system and at least one computer program, may be provided by the source 102 along with the content to be tested, and establishes the runtime environment for virtual execution of program(s) included in the software profile. The configured virtual machine 166 is then ready to provide virtual execution of packets.

As the virtual machine executes the packets, the backdoor detection analyzer 140 monitors its behavior closely for unauthorized activity, and in particular, for instance, for any and all black ports within the virtual machine opened by objects for listening. In one example, the backdoor analyzer 140 may, upon detecting opening of a black port for listening, transmit a command to the virtualized digital device to stop execution. However, it is preferable to allow execution to proceed so that the backdoor detection analyzer 140 can detect additional illegal or unauthorized activity, such as the opening of additional black ports, which may further evidence the characteristic behavior of malware contained in the content under test.

In some embodiments, the backdoor detection analyzer 140 monitors and analyzes the behavior of the virtual machine 166 in order to determine and identify a specific type of malware, such as malware of a specific family of polymorphic virus. The backdoor detection analyzer 140 may also pursue remediation, for example, through generating computer code configured to eliminate the malware or malicious network content or limit its propagation. In various embodiments, the backdoor detection analyzer 140 generates computer code configured to repair damage performed by malware.

FIG. 2A illustrates a controller 200 in accordance with an illustrative embodiment. The controller 200 may implement the backdoor detection system 100. The controller 200 may have at least a processor 210, a memory system 220, and a storage system 230, which are all coupled via an interconnect, such as bus 220. The processor 210 executes instructions. The terms, "execute" and "run", as used herein, are intended broadly to encompass the process of carrying out instructions, such as software instructions. The processor 210 may be implemented as one or more processor cores, and may be provided as a single device or as separate components. In some embodiments the processor may be implemented as a digital signal processor or application specific integrated circuits, and firmware may provide updatable logic. The memory system 220 permanently or temporarily stores data. The memory 220 may include, for example, RAM and/or ROM. The storage system 230 also permanently or temporarily stores data. The storage system 230 may include, for example, one or more hard drives and/or flash drives, or other form of mass storage. The storage in memory 220 and storage 230 is not to be regarded as being transitory in nature. The repositories 130 (FIG. 1) may be implemented as either memory 220 or storage system 230, or a combination thereof.

Figure 8:
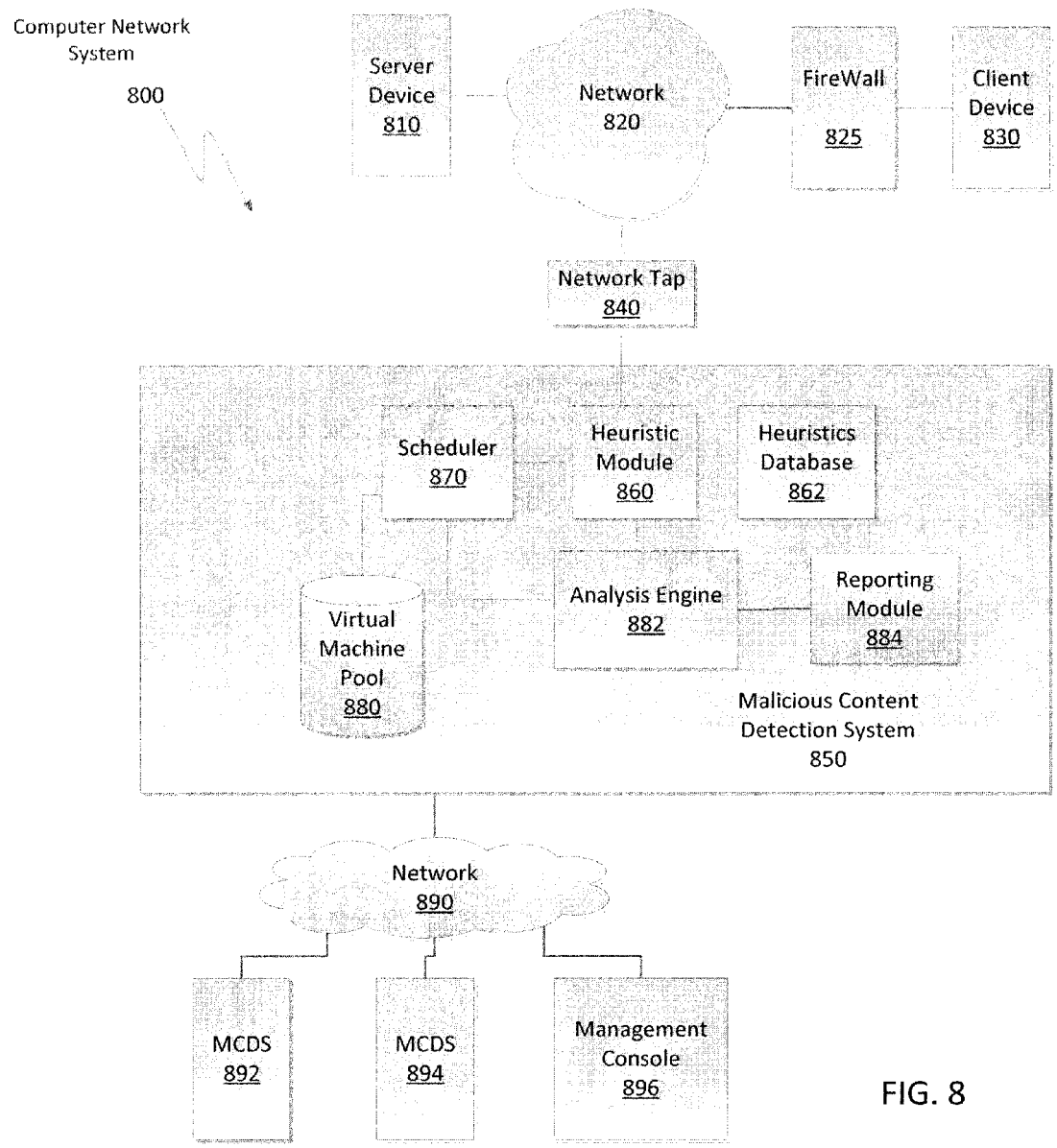
FIG. 8 is a block diagram of a computer network system deploying a malicious content detection system in accordance with an illustrative embodiment of the invention.

The controller 200 may also have a communication network interface 240, an input/output (I/O) interface 250, and a user interface 260. The communication network interface 240 may be coupled with a communication network 272 via a communication medium 270. The communications network interface 240 may communicate with other digital devices (not shown) via the communications medium 270. The communication interface 240 may include a network tap 840 (FIG. 8). The bus 220 may provide communications between the communications network interface 240, the processor 210, the memory system 220, the storage system 230, the I/O interface 250, and the user interface 260.

The I/O interface 250 may include any device that can receive input from or provide output to a user. The I/O interface 250 may include, but is not limited to, a flash drive, a compact disc (CD) drive, a digital versatile disc (DVD) drive, or other type of I/O peripheral (not separately shown). The user interface 260 may include, but is not limited to a keyboard, mouse, touchscreen, keypad, biosensor, display monitor or other human-machine interface (not separately shown) to allow a user to control the controller 200. The display monitor may include a screen on which is provided a command line interface or graphical user interface.

As noted above, the controller 200 may implement the backdoor detection system 100. In other embodiments of the invention, a number of different controllers (for example, each as illustrated and described for controller 200) may be used to implement the backdoor detection system. For example, a plurality of controllers (not separately shown) may be used to implement the virtual execution engine 120, the backdoor analyzer 140, and the event generator and reporting module 150.

Figure 2B:
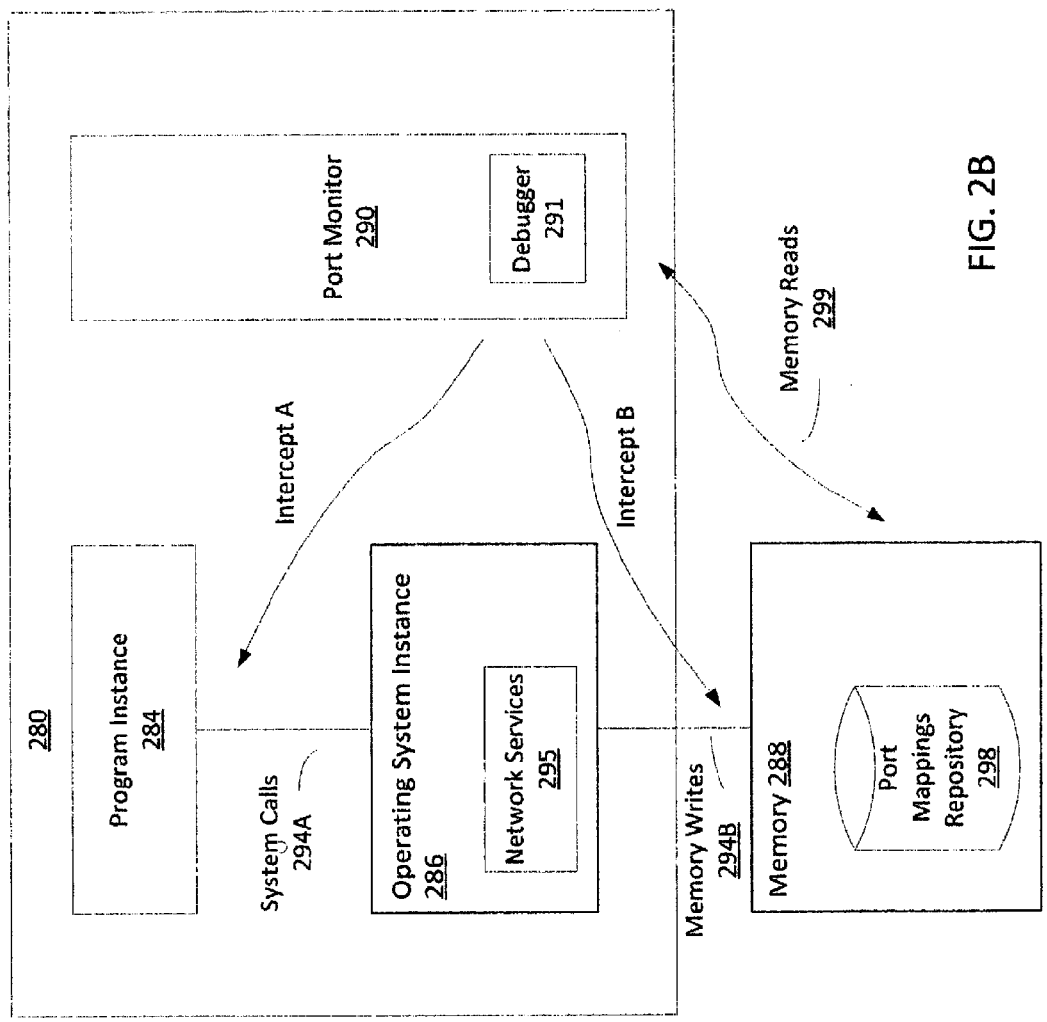
FIG. 2B is a block diagram of a virtual environment for identifying ports opened for listening by content, in accordance with an embodiment of the invention.

FIG. 2B depicts an environment 280 equipped in accordance with an embodiment of the invention for identifying ports opened for listening by content constituting a malware candidate or test sample being executed in the virtual machine 166 of FIG. 1. The environment 280 includes at least one program instance 284 corresponding to a program identified by the software profile (described above), an operating system instance 286 corresponding to the operating system identified by the software profile, a memory 288 and a port monitor 290. In operation, the port monitor 290 detects and extracts the port numbers of "listened to" ports in any of several alternative ways in various embodiments. The port monitor 290 may (a) intercept (diagrammatically illustrated by arrow "A") system calls (diagrammatically illustrated by arrow 294A) passed by the process 284 to the operating system instance 286, for example, BIND ( ) and LISTEN ( ) calls; (b) intercept (diagrammatically illustrated by arrow "B") memory writes (diagrammatically illustrated by arrow 294B) from a network services module 195 to a port repository 298 provided by memory 288, the writes being data providing a port number associated with a processes ID of a process with which it is bound for listening, or (c) read data providing the port number-process ID associations stored by a network services module 296 in the port mappings repository 298 provided by the memory 288. More specifically, the BIND ( ) system call followed by the LISTEN ( ) system call are Application Programming Interface (API) calls. By hooking these API calls, this approach may capture the parameters passed to these functions. These parameters provide the port number and associated process identifier. As is known in the art, API calls may be hooked using a debugger 291, e.g., included in the port monitor 290, and operable on the API calls from the network services module 296. As a further alternative, a combination of two or more of approaches of (a), (b) and (c) may be employed to assure detection of ports open for listening.

Whitelist and Blacklist Generation

FIG. 3A depicts an illustrative method 300 for generating a whitelist of legal ports. In step 320, the method 300 may identify any and all ports at which content may listen during execution, in accordance with the applicable standards, RFC, Protocol Standards, and technical specification documents of software vendors for the relevant protocols.

In alternative embodiments, the whitelist may include (a) ports that program(s) specified by the software profile are authorized to use for listening in accordance with their respective, associated protocols and applicable standards, or (b) ports that programs that generally run on digital devices of any type or of a specific type (e.g., tablet computer or desktop) are authorized to use for listening in accordance with their respective, associated protocols and applicable standards. For example, RFC 959 (File Transfer Protocol (FTP)) as promulgated by the Network Working Group, Internet Society (1985), specifies that ports 20 and 21 may be used for listening for FTP complying communications with an FTP server, and so the whitelist may include both ports 20 and 21. RFC 2476 ("Message Submission") as promulgated by the xxx (1995), specifies that ports 25 and 587 may be used SMTP-complying email communications with an email server, and so the whitelist may include both ports 25 and 587 for programs that use SMTP for communications. RFC 2616 specifies that port 80 is used for HTTP complying accesses to web content.

As an alternative to referencing separately all those documents, a compilation of authorized ports may be had with reference to certain websites, which have already collected information about ports. For example, speedguide.net offers a website providing information about ports at http://www.speedguide.net/port.php?port=1111. An advantage of this approach is that the resulting stored whitelist may be suitable for use across a plurality of different potential malware candidates' specific software profiles.

Accordingly, in some embodiments, the generation and storage of the whitelist may be regarded as infrastructural, and malware detection may then be carried out expeditiously on more than one malware candidate without interruption to develop a new whitelist for each profile. Embodiments of the invention may alternatively employ a whitelist specific to the software profile associated with each malware candidates being evaluated. Accordingly, the whitelist may need to be changed and the repository updated for each malware candidate before testing on that candidate may be conducted. This latter approach may increase the accuracy of malware detection in embodiments that rely on the whitelist since the authorized ports in the whitelist so generated will likely be fewer in number. Accordingly, if the software profile includes a web server application, the whitelist for that software may list ports 80. Similarly, if the software profile includes an SMTP server, Microsoft® Exchange®, the whitelist for that software may list port 25. If the software profile included both a web server and an email server, then the whitelist would include 80, 25.

Finally, in step 330, the resulting whitelist port numbers are stored in data structures in a whitelist repository 340.

Figure 3B:
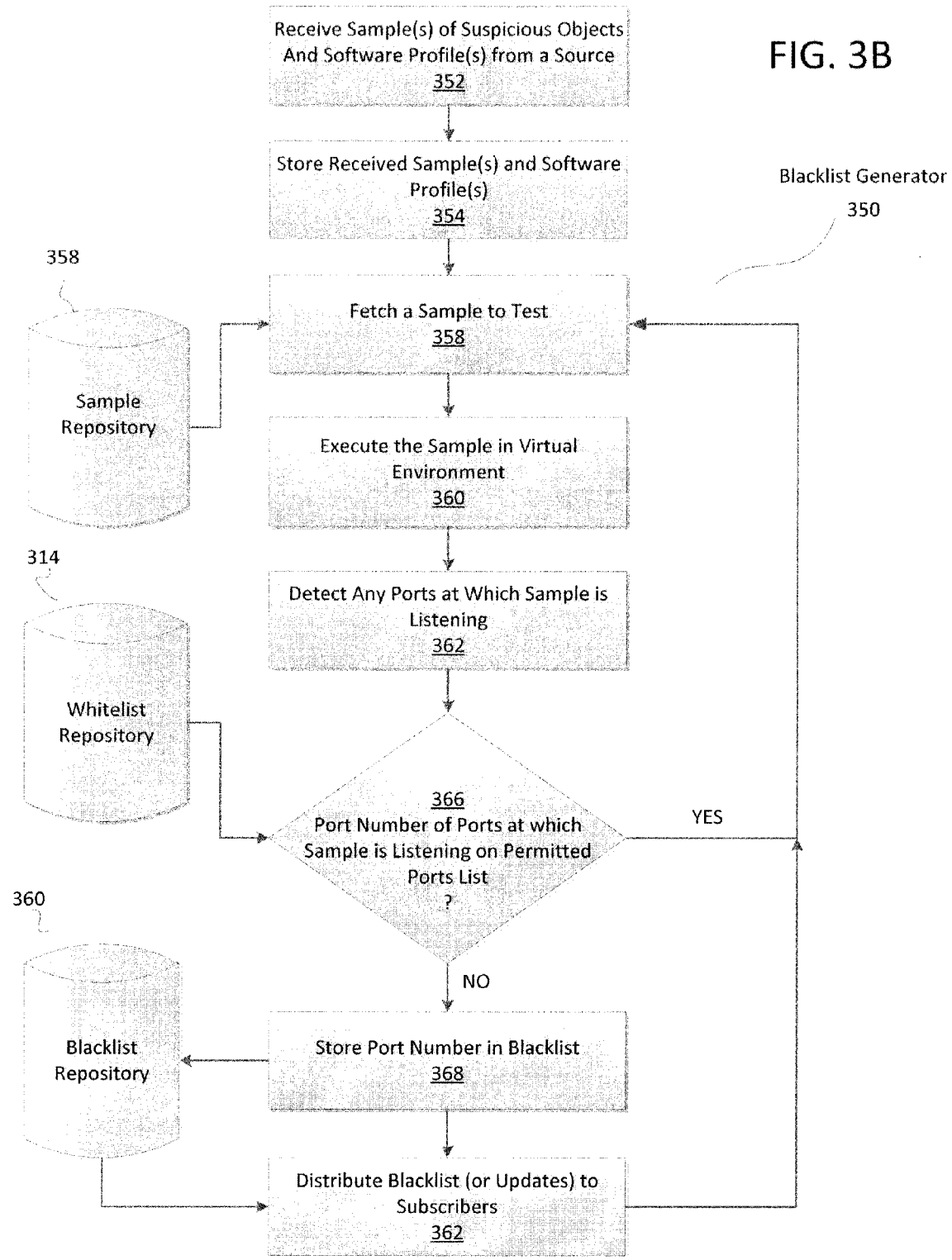
FIG. 3B is flow chart of a method, partially in block diagram form, for generating a blacklist for use by the backdoor detection system of FIG. 1, in accordance with an illustrative embodiment of the invention.

FIG. 3B depicts an illustrative method 300 for generating a blacklist of non-legal ports as performed by the backdoor detection system 100 or other embodiments of the invention. In step 352, a pre-determined test sample of one or more known malware objects (as opposed to a malware candidate) is received from a source. In step 352, the received sample of malware is stored in a sample repository or storage 356, which may be implemented in memory system 220 or storage system 230 of FIG. 2A. When the scheduler 160 is ready to initiate execution in the virtual execution engine 120 (FIG. 1), in step 358, the sample of malware is fetched for testing. In step 360, the sample is executed in the virtual execution engine.

In step 362, the method 300 detects any ports at which the sample of malware is listening, for example, in accordance with the approaches described above in conjunction with FIG. 2B, and, in step 366, determines if the port number of each port at which the sample of malware is listening is legal. To accomplish this, the method 300 extracts the port number, and compares the port number with port numbers in the whitelist obtained from the whitelist repository 314. The whitelist repository 314 stores a whitelist of legal ports, and may be generated in accordance with any the embodiments described in connection with FIG. 3A. If the port number matches any of the entries in the whitelist, the method 100 continues at step 358 with another sample from the sample repository 356.

In step 368, if the port number is not on the whitelist, the port number of the port at which the sample of malware was listening is stored to a blacklist repository and is available thereafter for use in testing unknown (though possibly suspicious) samples, which are also herein called malware candidates. Such use may be on the any backdoor detection system, including the one performing the method 300. Where it is desired to have other backdoor detection systems avail themselves of the updated backlist, in step 362, the revised backlist (or just the updates to the blacklist) may be distributed to other backdoor detection systems, perhaps on a paid subscription basis. In that way, subscribers to the updates can remain current in recognizing non-legal ports opened for listening by verified malware for digital devices with the same or similar software profiles.

Backdoor Detection System Using Blacklist

FIG. 4 depicts an illustrative backdoor detection system 400, which uses only a blacklist generated pursuant to FIG. 3B at test run-time to determine whether any port at which content under test is listening constitutes a black port, thus indicating that the content contains malware with a high probability. The backdoor detection system 400 includes a content receiver, scheduler and queue 410, a virtual execution engine 420, a backdoor analyzer 430, and an event generator and report module 440, all coupled for communication with one another (either directly or indirectly). The content receiver, scheduler and queue (RSQ) 410 receives the content to be tested in the form of packets or objects, over a network or via accessing a storage device (such as storage system 230 (FIG. 2A) or via I/O interface 250 (FIG. 2A)), and stores them in a queue or other repository 444. The RSQ 410 may also schedule the content for execution by the virtual execution engine 420. Of course, other embodiments may implement the RSQ 430 in one or more separate components or even move some or all of the functionality into other components, such as the virtual execution engine 430.

The RSQ 430 receives or otherwise obtains a software profile with the content to be tested. The software profile may specify the operating system and one or more specific programs, including version identifiers thereof, for software intended for execution in the digital device (e.g., client device 830 of FIG. 8), which is to be simulated by the virtual execution engine 420. For example, the software profile may specify a specific Microsoft® Windows® operating system, version XX, and Microsoft® Internet Explorer®, version YY, and so forth.

The virtual execution engine 420 includes a VM configurator 446, a replayer 448, and one or more virtual machines (VMs) 450, all coupled for communication with one another (either directly or indirectly). The VM configurator 446 is adapted to configure one or more VMs 450 in accordance with a software profile provided by the RSQ 430, that is, at least one of the VMs will be furnished with copies of the same software programs, preferably at the same release/version level, for execution in a virtual environment. The replayer 448 may serve to provide the content to the one or more VMs as though it were a source device transmitting content over a network. Alternatively, and depending on the nature of the content, the replayer 448 may provide the content to the VMs 450 simply by loading the content as a file or other object. The latter approach is particularly useful where the content constitutes data at rest rather than data in flight.

The backdoor detection analyzer 430 includes a port detector 452, blacklist comparator 454, and, in some embodiments, a signature generator 462, all coupled for communication with one another (either directly or indirectly). The port detector 452 monitors the one or more VMs executing the content to detect any and all ports that the content has opened for listening, for example, using any of the approaches described above in conjunction with FIG. 2B, and preferably only those "listened to" ports and not ports used for connections during communications. The port numbers of those ports are extracted and provided to the blacklist generator 462, which compares them to port numbers (i.e., black ports) in a blacklist repository 456, for example, where the stored blacklist was generated pursuant to FIG. 3B. If any of the port numbers of "listened to" ports match port numbers of black ports, the blacklist repository 456 is updated with their port numbers. The signature generator 462 receives the content corresponding to the newly identified blacklisted port numbers, and forms a signature for use in identifying that content. The signature can be formed by applying any of numerous known hash functions to the content, for example, as will be understood to those of ordinary skill in the art.

The report module 440 includes an event/alert generator 472, an intelligence sharing module 474, a user interface 476, and an I/O interface 478, all coupled for communication with one another (either directly or indirectly). The alert/event generator 472 receives metadata regarding the newly determined malware-containing content, such as the port numbers that it attempted to open for listening, as well as its signature. The alert/event generator 462 may generate an alert or a report, to be displayed or otherwise presented on a management console displayed via the GUI 476 and/or emailed or otherwise sent to a user or administrator via the I/O interface 478. The metadata and signature can also be shared with other, often remote malware detection systems (see FIG. 8) or other, often remote management consoles via the intelligence sharing module 474.

The backdoor detection system 400 may be implemented by one or more controllers, each, in one embodiment, in the form of controller 200 (FIG. 2A).

Figure 5:
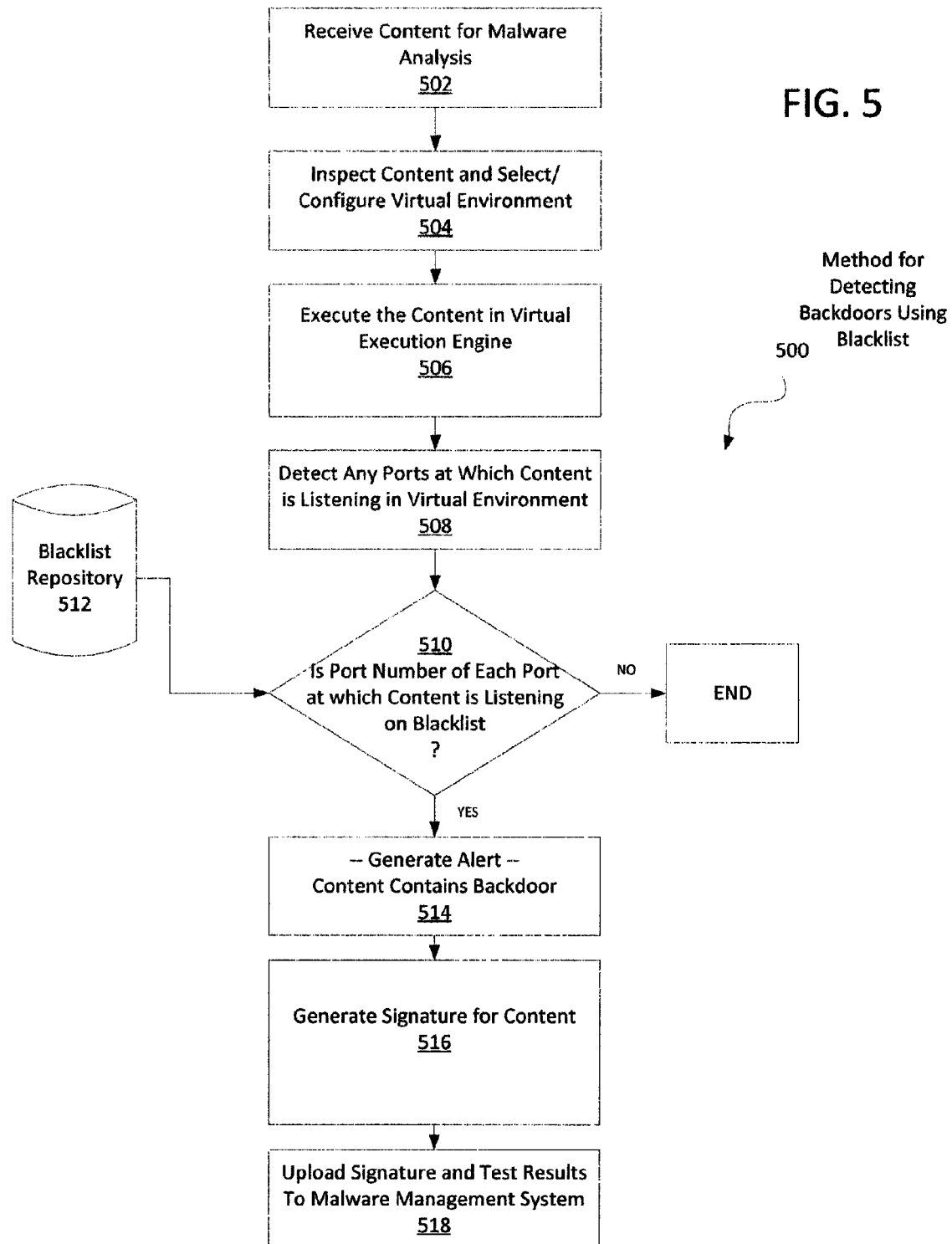
FIG. 5 is a flow chart, partially in block diagram form, of a computer-implemented method for detecting backdoors using the system of FIG. 1, in accordance with an illustrative embodiment of the invention.

FIG. 5 depicts an illustrative embodiment of a method 500 for detecting instruction backdoors using the malware detection system 500 of FIG. 4. In step 502, content is received for malware detection. In step 504, the content is inspected to obtain or confirm a software profile for configuring a virtual machine. Information regarding the software profile may be contained in packet headers received in content objects, and/or may be provided by metadata accompanying the content. The software profile may also or alternatively be generated using information obtained from one or more of a group of sources including information in the content, information from a reporting server on one or more computers exposed to the network content, and information stored within the malware detection system. The software profile preferably includes identification information specifying an operating system and at least one computer program.

In step 506, the content is executed in the virtual execution environment established by the configured virtual machine. In step 508, any ports opened for listening by the content is detected during execution of the content in the virtual machine. For this purpose, the virtual machine may be equipped with one or more virtual agents, each configured to monitor behavior and/or state of the program(s) and operating system executing within the virtual machine during processing of the malware candidate. The virtual machine may implement any of the approaches to detect "listened to" ports, as described in conjunction with FIG. 2B, above. In step 510, the method 500 determines whether any such opened ports are listed in a blacklist supplied by a blacklist repository 512. If none are on the blacklist, the method 500 ends with respect to the content under test. Other content may then be tested.

If the port number is on the blacklist, in step 514, an alert is generated to indicate that the malware candidate is associated with a high probability that it contains malware. Next, in some embodiments, in step 516, the method 500 may generate a signature for the detected malicious content, as described elsewhere herein. Also, the signature and test results may be uploaded to a malware management system or otherwise shared with other malware detection systems that can use the signatures for expedited evaluation of other content that may have signatures that match the current signature.

Backdoor Detection System Using Whitelist and Blacklist

Figure 6:
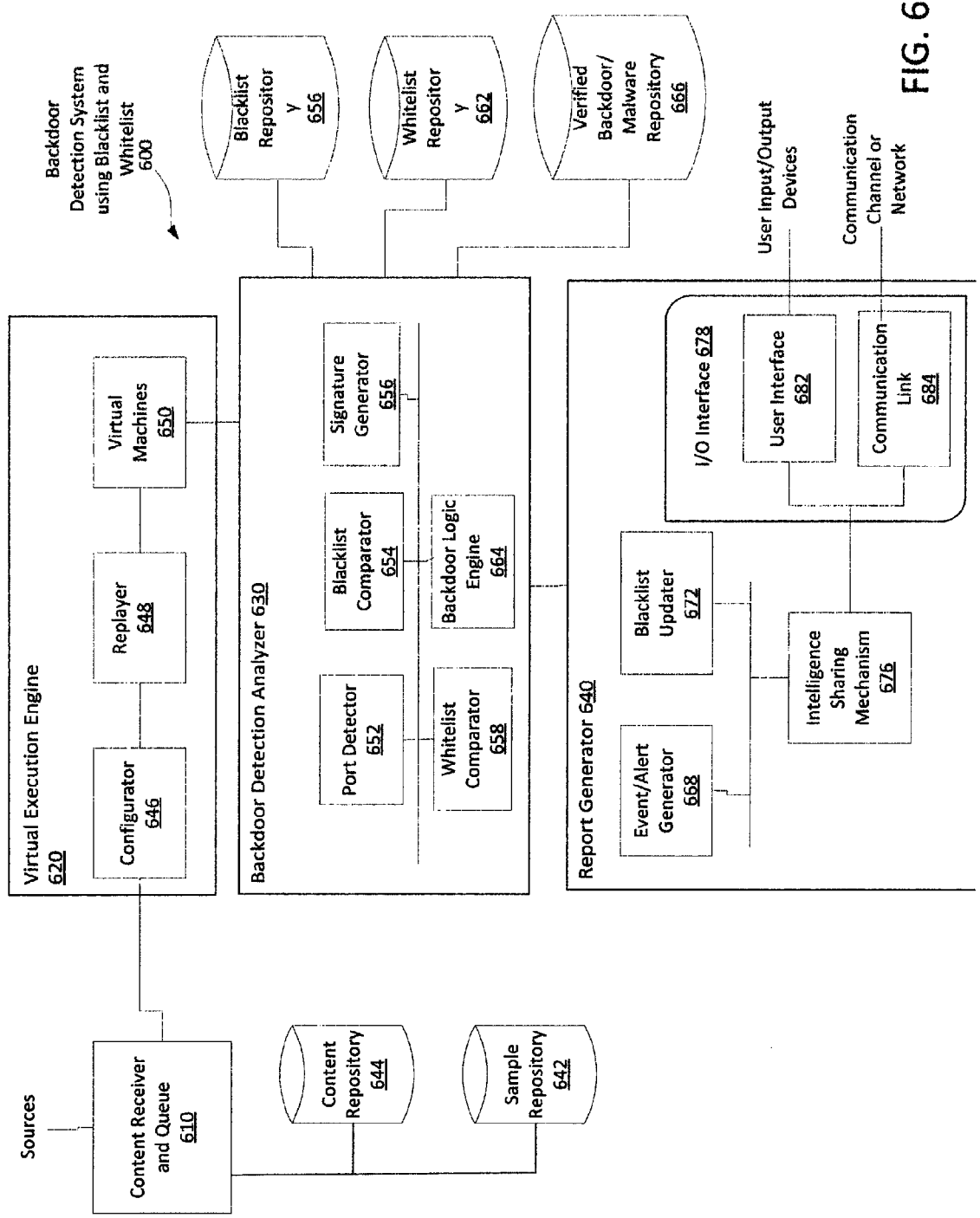
FIG. 6 is a block diagram of a backdoor detection system in accordance with yet another illustrative embodiment of the invention.

FIG. 6 depicts an illustrative backdoor detection system 600, which uses both a whitelist and a blacklist at test runtime to determine whether any port at which content under test is listening constitutes a black port, thus indicating that the content contains malware. The backdoor detection system 600 includes a content RSQ 610, a virtual execution engine 620, a backdoor analyzer 630, and an event generator and report module 660, all coupled for communication with one another (either directly or indirectly). The RSQ 610 receives the content to be tested in the form of packets or objects, over a network or via accessing a storage device, as in the case of system 400, and stores them in a queue or other repository 666. The RSQ 610 may also schedule the content for execution by the virtual execution engine 620. Of course, other embodiments may implement the RSQ 630 in one or more separate components or even move some or all of the functionality into the virtual execution engine 630. The RSQ 630 receives or obtains a software profile for the content to be tested.

The virtual execution engine 620 includes a VM configurator 646, a replayer 648, and one or more virtual machines (VMs) 650, all coupled for communication with one another (either directly or indirectly). The VM configurator 666 is adapted to configure one or more VMs 650 in accordance with a software profile provided by the RSQ 630. The replayer 648 serves to provide the content to the VMs 650 as though it were a source device transmitting content over a network or by loading the content as a file or other object.

The backdoor detection analyzer 630 includes a port detector 652, blacklist comparator 654, whitelist comparator 658, backdoor detection logic engine 664 and, in some embodiments, a signature generator 662, all coupled for communication with one another (either directly or indirectly). The port detector 652 monitors the one or more VMs 650 executing the content to detect any and all ports that the content opens for listening (and preferably on those "listened to" ports), and extracts the port numbers for those ports. To that end, the port detector 652 may advantageously implement any of the approaches for detecting "listened to" ports described above in conjunction with FIG. 2B. The port numbers of those ports are provided to the blacklist comparator 654, which compares them to port numbers in a blacklist repository 656 (i.e., a list of known black ports), for example, generated pursuant to FIG. 3B. The port numbers of those ports are also provided to a whitelist comparator 558, which compares them to port numbers in a whitelist repository 662, for example, generated pursuant to FIG. 3A. Backdoor logic engine 664 applies predetermined rules to the results of the comparisons of the comparators 654, 658. If those port numbers match an entry in the blacklist repository 656 and do not match an entry in the whitelist repository 662, the backdoor logic engine 664 determines that the content contains malware, or at least has a high probability of containing malware. The backdoor logic engine 664 may assign a probability score to the content indicating that high probability. For example, a probability score of 70% to 100% may be assigned.

The signature generator 656 receives the content having high probability scores of containing malware, and forms a signature from that content for use in identifying that content. The signature may be formed by applying any of numerous known hash functions to the content, for example, as will be understood to those of ordinary skill in the art. The signature may be used in anti-virus scanning utilities and other malware detection systems, for example.

In various embodiments, the report module 660 may include an event/alert generator 668, a blacklist updater 672, an intelligence sharing module 676, a user interface 676, and an I/O interface 678, all coupled for communication with one another (either directly or indirectly). The alert/event generator 668 receives metadata regarding the newly determined malware-containing content, such as the port numbers that it attempted to open for listening, as well as its signature, at least in some embodiments. The alert/event generator 668 may generate an alert or a report, to be displayed or otherwise presented on a management console (see FIG. 8) displayed via a user interface 682 and/or emailed or otherwise sent to a user or administrator via the I/O interface 684. The metadata and signature may also be shared with other, often remote malware detection systems (see FIG. 8) or other, often remote management consoles via the intelligence sharing module 676. Where no indication of instruction backdoors is found, that too may be reported by the report module 660.

The backdoor detection system 600 may be implemented by one or more controllers, each, in one embodiment, in the form of controller 200 (FIG. 2A).

Figure 7:
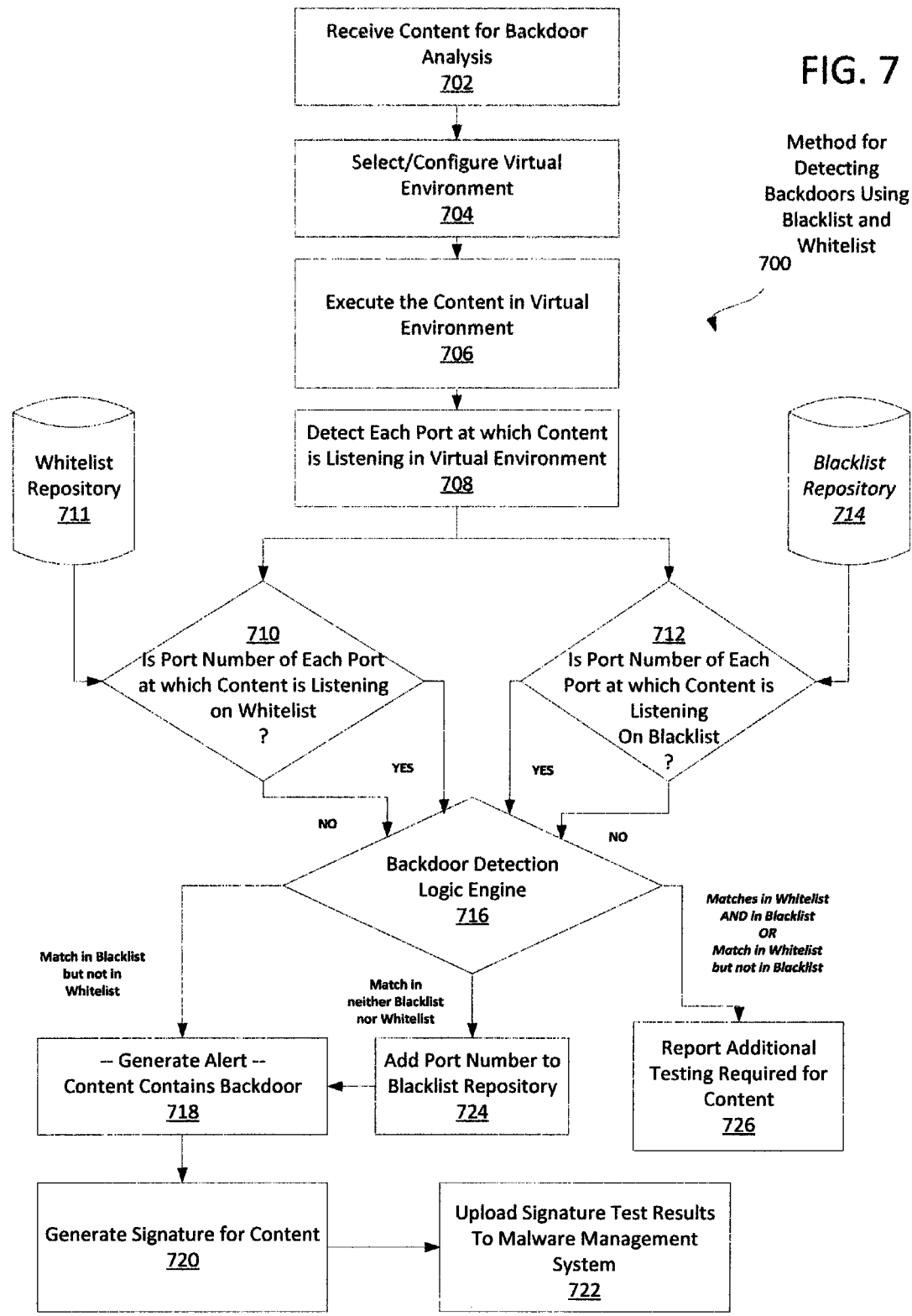
FIG. 7 is a flow chart, partially in block diagram form, of a computer-implemented method for detecting backdoors using the backdoor detection system of FIG. 1, in accordance with another illustrative embodiment of the invention.

FIG. 7 depicts an illustrative embodiment of a method 700 for discovering instruction backdoors using the malware detection system 600 of FIG. 6. In step 702, content is received for malware detection. In step 706, the content is inspected to obtain or confirm a software profile for configuring a virtual machine. As noted above, the software profile may be contained in header information received in content objects and/or in metadata accompanying the content. The software profile preferably includes identification information specifying an operating system and at least one program.

In step 705, the content is executed in the virtual execution environment established by the configured virtual machine. In step 708, any port opened for listening by the content (and preferably only those ports) is detected during execution of the content in the virtual machine in accordance with any of the approaches described above in conjunction with FIG. 2B. In step 710, the method 700 determines whether any such opened port is listed in a whitelist supplied by a whitelist repository 711. In step 712, the method 700 determines whether any such opened port is listed in a blacklist supplied by a blacklist repository 712.

Next, in step 715, a backdoor logic engine may combine the results from steps 710 and 712, by applying the following logic: If the port number has a match in the blacklist but not in the whitelist, in step 718, an alert is generated signaling a high probability that the content contains malware. If the port number matches neither any entry in the blacklist nor any entry in the whitelist, the port number is added to the blacklist in step 726 and the method 700 proceeds to step 718, as described above. If the part number matches entries in both the whitelist and the blacklist or matches only an entry in the whitelist but not in the blacklist, a report is generated in step 725 to the effect that additional testing is required. After step 718, in step 720, in some embodiments, a signature is generated for the content and, in step 722, the signature and test results are uploaded, both as described previously.

In some embodiments, a backdoor detection system may utilize only a whitelist of "listened to" ports generated as described above, and stored in a whitelist repository rather than a blacklist as in the foregoing embodiments. Accordingly, if content opens a port for listening that has a port number not on the whitelist, the content is deemed to have a probability score indicating a high probability of containing malware, or at least a probability score indicating that the content is suspicious and may require further evaluation.

Computer Network System

FIG. 8 is a block diagram of an illustrative computer network system 800 having a malicious content detection system 850 in accordance with a further illustrative embodiment. The malicious content detection system 850 is illustrated with a server device 810 and a client device 830, each coupled for communication via a communication network 820. In various embodiments, there may be multiple server devices and multiple client devices sending and receiving data to/from each other, and the same device can serve as either a server or a client in separate communication sessions. Although FIG. 8 depicts data transmitted from the server device 810 to the client device 830, either device can transmit and receive data from the other.

The malicious network content detection system 850 may monitor exchanges of network content (e.g., web content) in real-time rather than intercepting and holding the network content until such time as it can determine whether the network content includes malicious network content. The malicious network content detection system 825 may be configured to inspect exchanges of network content over the communication network 820, identify suspicious network content, and analyze the suspicious network content using a virtual machine to detect malicious network content. In this way, the malicious network content detection system 850 may be computationally efficient and scalable as data traffic volume and the number of computing devices communicating over the communication network 820 increase. Therefore, the malicious network content detection system 825 may not become a bottleneck in the computer network system 800.

The communication network 820 may include a public computer network such as the Internet, in which case a firewall 825 may be interposed between the communication network 820 and the client device 830. Alternatively, the communication network may be a private computer network such as a wireless telecommunication network, wide area network, or local area network, or a combination of networks. Though the communication network 820 may include any type of network and be used to communicate different types of data, communications of web data may be discussed below for purposes of example.

The malicious network content detection system 825 is shown as coupled with the network 820 by a network tap 840. The network tap 840 may include a digital network tap configured to monitor network data and provide a copy of the network data to the malicious network content detection system 825. Network data may comprise signals and data that are transmitted over the communication network 820 including data flows from the server device 810 to the client device 830. In one example, the network tap 840 monitors and copies the network data without an appreciable decline in performance of the server device 810, the client device 830, or the communication network 820. The network tap 840 may copy any portion of the network data, for example, any number of data packets from the network data. In embodiments where the malicious content detection system 850 is implemented as an dedicated appliance or a dedicated computer system, the network tap 840 may include an assembly integrated into the appliance or computer system that includes network ports, network interface card and related logic (not shown) for connecting to the communication network 860 to non-disruptively "tap" traffic thereon and provide a copy of the traffic to the heuristic module 850. In other embodiments, the network tap 840 can be integrated into a firewall, router, switch or other network device (not shown) or can be a standalone component, such as an appropriate commercially available network tap. In virtual environments, a virtual tap (vTAP) can be used to copy traffic from virtual networks.

The network tap 840 may also capture metadata from the network data. The metadata may be associated with the server device 810 and/or the client device 110. For example, the metadata may identify the server device 810 and/or the client device 830. In some embodiments, the server device 810 transmits metadata which is captured by the tap 815. In other embodiments, a heuristic module 860 (described herein) may determine the server device 810 and the client device 830 by analyzing data packets within the network data in order to generate the metadata. The term, "content," as used herein may be construed to include the intercepted network data and the metadata unless the context requires otherwise.

The malicious network content detection system 825 may include a heuristic module 860, a heuristics database 862, a scheduler 870, a virtual machine pool 880, an analysis engine 882 and a reporting module 884. In some embodiments, the network tap 840 may be contained within the malicious network content detection system 125.

The heuristic module 860 receives the copy of the network data from the network tap 840 and applies heuristics to the data to determine if the network data might contain suspicious network content. The heuristics applied by the heuristic module 860 may be based on data and/or rules stored in the heuristics database 862. In one example, the heuristic module 860 flags network data as suspicious after applying a heuristic analysis. The suspicious network data may then be provided to the scheduler 870. In some embodiments, the suspicious network data is provided directly to the scheduler 870 with or without buffering or organizing one or more data flows.

When a characteristic of the packet, such as a sequence of characters or keyword, is identified that meets the conditions of a heuristic, a suspicious characteristic of the network content is identified. The identified characteristic may be stored for reference and analysis. In some embodiments, the entire packet may be inspected and multiple characteristics may be identified before proceeding to the next step. In some embodiments, the characteristic may be determined as a result of an analysis across multiple packets comprising the network content. A score related to a probability that the suspicious characteristic identified indicates malicious network content is determined.

The heuristic module 860 may also provide a priority level for the packet and/or the features present in the packet. The scheduler 160 may then load and configure a virtual machine from the virtual machine pool 880 in an order related to the priority level, and dispatch the virtual machine to the analysis engine 882 to process the suspicious network content.

The heuristic module 860 may provide the packet containing the suspicious network content to the scheduler 870, along with a list of the features present in the packet and the malicious probability scores associated with each of those features. Alternatively, the heuristic module 860 may provide a pointer to the packet containing the suspicious network content to the scheduler 870 such that the scheduler 870 may access the packet via a memory shared with the heuristic module 860. In another embodiment, the heuristic module 860 may provide identification information regarding the packet to the scheduler 870 such that the scheduler 870, replayer 805, or virtual machine may query the heuristic module 860 for data regarding the packet as needed.

The scheduler 160 may identify the client device 110 and retrieve a virtual machine associated with the client device 110. A virtual machine may itself be executable software that is configured to mimic the performance of a device (e.g., the client device 110). The virtual machine may be retrieved from the virtual machine pool 165. Furthermore, the scheduler 160 may identify, for example, a web browser running on the client device 110, and retrieve a virtual machine associated with the web browser.

In some embodiments, the heuristic module 860 transmits the metadata identifying the client device 830 to the scheduler 870. In other embodiments, the scheduler 870 receives one or more data packets of the network data from the heuristic module 860 and analyzes the one or more data packets to identify the client device 830. In yet other embodiments, the metadata may be received from the network tap 840.

The scheduler 870 may retrieve and configure the virtual machine to mimic the pertinent performance characteristics of the client device 830. In one example, the scheduler 870 configures the characteristics of the virtual machine to mimic only those features of the client device 830 that are affected by the network data copied by the network tap 840. The scheduler 870 may determine the features of the client device 830 that are affected by the network data by receiving and analyzing the network data from the network tap 840. Such features of the client device 830 may include ports that are to receive the network data, select device drivers that are to respond to the network data, and any other devices coupled to or contained within the client device 830 that can respond to the network data. In other embodiments, the heuristic module 860 may determine the features of the client device 830 that are affected by the network data by receiving and analyzing the network data from the network tap 840. The heuristic module 850 may then transmit the features of the client device to the scheduler 870.

The virtual machine pool 880 may be configured to store one or more virtual machines. The virtual machine pool 880 may include software and/or a storage medium capable of storing software. In one example, the virtual machine pool 880 stores a single virtual machine that can be configured by the scheduler 870 to mimic the performance of any client device 830 on the communication network 820. The virtual machine pool 880 may store any number of distinct virtual machines that can be configured to simulate the performance of a wide variety of client devices 810.

The analysis engine 882 simulates the receipt and/or display of the network content from the server device 810 after the network content is received by the client device 110 to analyze the effects of the network content upon the client device 830. The analysis engine 882 may identify the effects of malware or malicious network content by analyzing the simulation of the effects of the network content upon the client device 830 that is carried out on the virtual machine. There may be multiple analysis engines 850 to simulate multiple streams of network content. The analysis engine 882 may be configured to monitor the virtual machine for indications that the suspicious network content is in fact malicious network content. Such indications may include unusual memory accesses, unusual network transmissions, unusual changes in performance, and the like. Importantly, such indications may also include the detection of an instruction backdoor. The detection of the instruction backdoor may be used to indicate that that the network content contains malware. Indeed, in some embodiments, the conclusion that malware is present with a high probability may be predicated solely on the detection of an instruction backdoor. In other embodiments, the conclusion that malware is present with a high probability may be predicated on detecting plural indications that the suspicious network content is in fact malicious network content, including the detection of an instruction backdoor. The analysis engine 882 may flag the suspicious network content as malicious network content according to the observed behavior of the virtual machine. The reporting module 884 may issue alerts indicating the presence of malware, and using pointers and other reference information, identify the packets of the network content containing the malware. Additionally, the server device 810 may be added to a list of malicious network content providers, and future network transmissions originating from the server device 810 may be blocked from reaching their intended destinations, e.g., by firewall 825.

The computer network system may also include a further communication network 890, which couples the malicious content detection system (MCDS) 850 with one or more other MCDS, of which MCDS 892 and MCDS 894 are shown, and a management console 896. The communication network 890 may, in some embodiments, be coupled for communication with or part of network 820. The management console 896 is responsible for managing the MCDS 850, 892, 894 and providing updates to their operation systems and software programs. Also, the management console may cause malware signatures generated by any of the MCDS 850, 892, 894 to be shared with one or more of the other MCDS 850, 892, 894, for example, on a subscription basis. Moreover, the backdoor detection system as described in the foregoing embodiments may be incorporated into one or more of the MCDS 850, 892, 894, or into all of them, depending on the deployment. Also, the management console 896 itself or another dedicated computer station may incorporate the backdoor detection system in deployments where such detection is to be conducted at a centralized resource.

Further information regarding an embodiment of a malicious content detection system can be had with reference to U.S. Pat. No. 8,181,553, the disclosure of which being incorporated herein by reference in its entirety.

CONCLUSION

The embodiments discussed herein are illustrative. As these embodiments are described with reference to illustrations, various modifications or adaptations of the methods and/or specific structures described may become apparent to those skilled in the art. For example, aspects of the invention may be performed by executable software, such as a program or operating system. For example, embodiments of the invention may be implemented in an operating system instance, which monitors any and all ports that an executing program (i.e., a process) has requested be opened for listening as by, for example, tracking system calls received by the operating system instance from the program instance. If the ports are included on a blacklist available to the operating system instance, then it may report an instruction backdoor. For example, where the program instance is a browser, a web page being downloaded for display may be associated with a high probability of containing malicious code; or, where the program instance is an email application, an email or attachment to an email being processed for display may be associated with a high probability of containing malicious code. Of course, the operating system may incorporate other aspects of the invention instead of or in addition to that just described, as will be appreciated in light of the description contained in this specification. Similarly, a utility or other program may also implement the invention. Noteworthy, these embodiments need not employ a virtual environment, but rather test for an instruction backdoor during normal execution of a program within a computer system.

It should be understood that the operations performed by the above-described illustrative embodiments are purely exemplary and imply no particular order. Further, the operations can be used in any sequence when appropriate and can be partially used. With the above embodiments in mind, it should be understood that the present invention may employ various computer-implemented operations involving data stored in computer systems. These operations include physical manipulation of physical quantities. Usually, though not necessarily, these quantities take the form of electrical, magnetic, or optical signals capable of being stored, transferred, combined, compared, and otherwise manipulated.

Any of the operations described herein are useful machine operations. The present invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations, or multiple apparatus each performing a portion of the operations. Where apparatus or components of apparatus are described herein as being coupled or connected to other apparatus or other components, the connection may be direct or indirect, unless the context requires otherwise.

The present invention can also be embodied as computer readable code on a computer readable medium. The computer readable medium is any data storage device that can store data, which can be thereafter be read by a computer system. Examples of the computer readable medium include hard drives, flash drives, read-only memory, random-access memory, CD-ROMs, CD-Rs, CD-RWs, magnetic tapes, and other optical and non-optical data storage devices. The computer readable medium can also be distributed over a network-coupled computer system so that the computer readable code is stored and executed in a distributed fashion. The computer readable medium can also be distributed using a switching fabric, such as used in computer farms.

The above-described components, modules and engines may be comprised of instructions that are stored on storage media (e.g., non-transitory computer readable media). The instructions may be retrieved and executed by a processor. Some examples of instructions include software, program code, and firmware. Some examples of storage media comprise memory devices and integrated circuits. The instructions are operational when executed by the processor to direct the processor to operate in accordance with embodiments of the present invention. Those skilled in the art are familiar with instructions, processor(s), and storage media.

It will be appreciated by those of ordinary skill in the art that modifications to and variations of the above-described embodiments of a system and method of detecting backdoors and malware may be made without departing from the inventive concepts disclosed herein. Accordingly, the specification and drawings are to be regarded as illustrative rather than restrictive, and the invention should not be viewed as limited except as by the scope and spirit of the appended claims. It will be recognized that the terms "comprising," "including," and "having," as used herein, are specifically intended to be read as open-ended terms of art.

What is claimed is:

1. A computer-implemented method for detecting a backdoor to a computer system, comprising:
   inspecting content comprising a malware candidate;
   configuring a virtual machine provided by a controller, the virtual machine executing an operating system instance and a program instance;
   executing the content comprising the malware candidate in the virtual machine;
   detecting whether the content comprising the malware candidate is listening to a port in the virtual machine, and identifying a port number associated with the port at which the content comprising the malware candidate is listening;
   determining whether the port number of the port at which the content comprising the malware candidate is listening is a black port by accessing a first repository that comprises a first data structure of port numbers of ports at which known malware has been detected as listening to determine whether the port number of the port is in the first data structure of the first repository, and initiating an access to a second repository that comprises a second data structure of port numbers of ports that are legally accessed by one or more programs including the program instance to determine whether the port number of the port is in the second data structure of the second repository;

in response to the port number of the port being present in the first data structure of the first repository, reporting the content comprising the malware candidate as including the backdoor.

2. The computer-implemented method of claim 1, wherein detecting comprises intercepting system calls from the program instance executing within the virtual machine to the operating system instance executing within the virtual machine, the system calls requesting the operating system instance bind an identifier of the program instance to a port number of a port on which the content comprising the malware candidate is to listen.

3. The computer-implemented method of claim 1, wherein detecting comprises reading data from a memory included in the controller specifying a program identifier of a program instance executing within the virtual machine and a port number corresponding to a port at which the content comprising the malware candidate is to listen.

4. The computer-implemented method of claim 1, wherein the content comprising the malware candidate is associated with a score related to a probability that the network content includes malicious network content; and further comprising setting the score upon determining that the port at which the content comprising the malware candidate is listening is a black port to a level sufficient to indicate a high probability of malware.

5. The computer-implemented method of claim 1, wherein the first data structure of the first repository includes a blacklist of ports at which known malware has been detected as listening.

6. The computer-implemented method of claim 5, wherein the second data structure of the second repository includes a whitelist.

7. The computer-implemented method of claim 1, wherein the backdoor is an instruction backdoor that includes the malware candidate that opens the port, that is a communication port of the computer system, for listening for instructions or other communications from an external malicious computer system or program.

8. The computer-implemented method of claim 1, wherein the first repository does not contain port numbers of ports that are legally accessed by the program instance.

9. The computer-implemented method of claim 6, further comprising updating the blacklist with the port number of the port at which the content comprising the malware candidate is listening in the event that the comparing of the port number of the port to the port numbers in the blacklist and the port numbers in the whitelist indicates that the port number of the port is not in the first repository or the second repository.

10. The computer-implemented method of claim 6, further comprising indicating that further testing is required in the event that the port number of the port at which the content comprising the malware candidate is listening is in both the first repository and the second repository.

11. The computer-implemented method of claim 6, wherein reporting comprises reporting that the content comprising the malware candidate includes the backdoor and thereby verifying that the malware candidate should be treated as comprising malware, but only in response to determining that the port number of the port at which the content comprising the malware candidate is listening is in the first repository without being in the second repository.

12. The computer-implemented method of claim 1, further comprising generating a malware signature for the content comprising the malware candidate that includes the backdoor and sharing the malware signature with at least one malware detection system.

13. The computer-implemented method of claim 12, further comprising uploading the malware signature to a malware management system.

14. A system for detecting a backdoor to a computer system, comprising:
a controller comprising a processor and a memory coupled with the processor and configured to store a repository for content comprising a malware candidate, the controller further comprising
a) a configurator adapted to inspect the content comprising the malware candidate and configure a virtual machine in response to the inspection, the virtual machine configured to execute an operating system instance and a program instance,
b) a virtual machine configured to execute the content comprising the malware candidate, and
c) a backdoor analyzer configured to (i) detect whether the content comprising the malware candidate is listening at a port in the virtual machine, (ii) identify a port number associated with the port at which the content comprising the malware candidate is listening, (iii) determine whether the port number of the port at which the content comprising the malware candidate is listening is a legal port by initiating an access a first repository comprising at least one data structure containing a plurality of port numbers of ports that are legally accessed by the program instance so as to determine whether the port number of the port corresponds to one of the plurality of port numbers in the first repository, and (iv) determine whether the port number of the port at which the content comprising the malware candidate is listening is an illegal port by accessing a second repository comprising at least one data structure containing a plurality of port numbers of ports at which known malware has been detected as listening and comparing the port number of the port to the port numbers in the second repository; and
an event generator coupled with the controller and an output interface, and configured to generate an event indicating, if an illegal port, that the content comprising the malware candidate includes the backdoor and identifying that the malware candidate should be treated as comprising malware.

15. The system of claim 14, wherein the backdoor analyzer further comprises a port monitor communicatively coupled with the virtual machine for intercepting one or more system calls from the program instance executing within the virtual machine to the operating system instance executing within the virtual machine, the system calls requesting for the program instance bind to and listen to a port provided by the operating system instance.

16. The system of claim 14, wherein the backdoor analyzer further comprises a port monitor for reading data from a memory included in the controller specifying a program instance identifier corresponding to the program and a port number corresponding to a port at which the content comprising the malware candidate is listening.

17. The system of claim 14, wherein the content comprising the malware candidate is associated with a score related to a probability that the network content includes malicious network content; and wherein the controller is further configured to increase the score upon determining that the port at which the content comprising the malware candidate is listening is not a legal port, the increase being sufficient to indicate a high probability of malware.

18. The system of claim 14, wherein the second repository comprises the at least one data structure operating as a blacklist of ports at which known malware has been detected as listening.

19. The system of claim 14, wherein the second repository comprises the at least one data structure operating as a blacklist of ports at which known malware has been detected as listening; the blacklist being associated with a software profile corresponding to that of the configured virtual machine.

20. The system of claim 14, wherein the backdoor is an instruction backdoor that comprises malware that opens the port for listening for instructions or other communications from an external malicious computer system or program.

21. The system of claim 14, wherein the second repository includes a plurality of entries each corresponding to a port number and the entries do not include port numbers of ports that are legally accessed by programs identified by a software profile associated with the configured virtual machine.

22. The system of claim 14, wherein content within the at least one data structure of the second repository comprises a blacklist and content within the at least one data structure of the first repository comprises a whitelist.

23. The system of claim 22, wherein backdoor analyzer is configured to update the blacklist with the port number of the port in the event that the port number of the port is in neither the second repository nor the first repository.

24. The system of claim 22, wherein the backdoor analyzer is coupled with a user interface and is configured to report via the user interface that further testing is required in the event the port number of the port is in both the blacklist of the second repository and the whitelist of the first repository.

25. The system of claim 22, wherein the backdoor analyzer is configured to report via the user interface in the event the port number of the port is in the blacklist of the second repository without being in the whitelist of the first repository that the content comprising the malware candidate includes the backdoor and thereby verifying that the malware candidate should be treated as comprising malware.

26. The system of claim 14, wherein the backdoor analyzer further comprising a signature generator for generating a malware signature for the content comprising the malware candidate that includes the backdoor and sharing the malware signature with at least one malware detection system.

27. The system of claim 14 further comprising a network interface, and wherein the controller is configured to upload, via the network interface, a malware signature generated by the backdoor analyzer to a malware management system.

28. A system for discovering an instruction backdoor to a digital device to detect malware, the system comprising:
   a controller comprising a memory and at least one virtual machine configured with a software profile which identifies at least one program and an operating system to mimic aspects of the digital device and, in a controlled and monitored environment, load and execute one or more objects; and
   a backdoor analyzer coupled for communication with the controller, a first repository and a second repository, the backdoor analyzer is configured to detect, during execution by the virtual machine of the one or more objects, a port opened by the one or more objects for listening for communications from an external system that is external to the digital device,
   wherein the backdoor analyzer is further configured to identify a port number for the port opened for listening, check whether the port number is associated with a black port by at least checking whether the port number for the opened port corresponds with an entry on a blacklist stored in the first repository of known malware, checking whether the port number for the opened port is absent from an entry on a whitelist stored in the second repository of ports used by the at least one program of the software profile, and responsive to the port number corresponding to the entry on the blacklist, reporting that the one or more objects include malware operating as the instruction backdoor.

29. The system of claim 28, wherein the backdoor analyzer is further configured to update the blacklist with the port number for the opened port in response to the port number being absent from the first repository and the second repository.

30. The system of claim 28, wherein the backdoor analyzer is configured to indicate that further testing is required in the event the port number of the opened port is in both an entry of the blacklist of the first repository and an entry of the whitelist of the second repository.

31. The system of claim 28, wherein a determination by the backdoor analyzer that the one or more objects opens a black port is sufficient predicate by itself to indicate that the one or more content objects comprise malware.

32. The system of claim 28, wherein the instruction backdoor comprises the malware that opens the opened port for listening for instructions or other communications from the external system.

33. The system of claim 28, wherein the virtual machine further comprises a port monitor communicatively coupled with the backdoor analyzer for intercepting system calls from a process executing within the virtual machine to an operating system instance executing within the virtual machine, the system calls requesting for the process to bind to and listen to a port provided by the operating system instance.

34. The system of claim 28, wherein the virtual machine further comprises a port monitor coupled with the backdoor analyzer for reading data from a memory included in the controller specifying a process number corresponding to the process and a port number corresponding to a port at which the one or more content objects are listening.

35. A non-transitory computer readable storage medium having stored thereon instructions executable by a processor for performing a method, the method comprising the steps of:
   executing a program instance to process the content;
   detecting whether the program is listening to a port, and identifying a port number associated with the port;
   determining whether the port number of the port at which the program instance is listening is an authorized port, the determining comprises (i) accessing a blacklist repository that includes a first data structure of port numbers of ports at which known malware has been detected as listening, (ii) initiating an access of a whitelist repository that includes a second data structure of port numbers of ports that are legally accessed by programs, and (iii) determining whether the port number of the port is in the first data structure of the blacklist repository or is in the second data structure of the whitelist repository; and
   in response to (a) the port number of the port being within the first data structure of the blacklist repository or (b) the port number of the port being absent from the first data structure of the blacklist repository and the second data structure of the whitelist repository, reporting the content as containing a backdoor.

36. The non-transitory computer readable storage medium of claim 35, wherein the processor detecting whether the program is listening to the port comprises intercepting system calls from the program instance to an operating system instance, the system calls requesting the operating system instance bind an identifier of the program instance to a port number of the port on which the program instance is listening.

37. The non-transitory computer readable storage medium of claim 35, wherein the processor detecting whether the program is listening to the port comprises reading data from a memory specifying a program identifier of a program instance and a port number corresponding to a port at which the program instance is listening.

38. The non-transitory computer readable storage medium of claim 35, wherein the processor further updating the first data structure of the blacklist repository with the port number of the port at which the content comprising the malware candidate is listening.

39. The non-transitory computer readable storage medium of claim 35, wherein the backdoor is an instruction backdoor that includes a malware that opens the port, which is a communication port of a digital device including the non-transitory computer readable storage medium, for listening for instructions or other communications from an external malicious computer system or program.

* * * * *